United States Patent
Ito et al.

(10) Patent No.: US 7,515,304 B2
(45) Date of Patent: Apr. 7, 2009

(54) SMOOTHING OF DISPOSITIONS OF LATTICE POINTS FOR CREATION OF PROFILE

(75) Inventors: Takashi Ito, Nagano-ken (JP); Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 11/329,310

(22) Filed: Jan. 9, 2006

(65) Prior Publication Data

US 2006/0176529 A1 Aug. 10, 2006

(30) Foreign Application Priority Data

Jan. 12, 2005 (JP) .............................. 2005-005072

(51) Int. Cl.
*H04N 1/60* (2006.01)
(52) U.S. Cl. ...................... 358/3.23; 358/1.9; 358/518; 345/601; 345/602; 345/604; 345/606; 382/167
(58) Field of Classification Search .................. 358/1.9, 358/3.23, 518; 345/600, 601, 604, 606; 382/167
See application file for complete search history.

(56) References Cited

U.S. PATENT DOCUMENTS

| 6,049,400 | A * | 4/2000 | Vondran, Jr. ................. 358/1.9 |
| 6,768,559 | B1 * | 7/2004 | Kuwata et al. ............... 358/1.9 |
| 7,345,787 | B2 | 3/2008 | Ito et al. |
| 7,369,272 | B2 | 5/2008 | Ito et al. |
| 2003/0090726 | A1 * | 5/2003 | Arai ............................ 358/518 |
| 2004/0234127 | A1 * | 11/2004 | Arai et al. ..................... 382/167 |

(Continued)

FOREIGN PATENT DOCUMENTS

EP 1349373 A2 * 10/2003

(Continued)

OTHER PUBLICATIONS

Wu et al., "The Geodesic Self-Organizing Map and its error analysis", Jan. 2005, ACSC '05: Proceedings of the Twenty-eighth Australasian conference on Computer Science, Australian Computer Society, Inc, vol. 38, pp. 343-351.*

(Continued)

*Primary Examiner*—Mark K Zimmerman
*Assistant Examiner*—Javier J Ramos
(74) *Attorney, Agent, or Firm*—Martine Penilla & Gencarella, LLP

(57) ABSTRACT

In order to create a profile that associates lattice points defined in an equipment-dependent color space with lattice points defined in an equipment-independent color space, a reference profile that associates a plurality of lattice points in the equipment-dependent color space with lattice points in the equipment-independent color space is retrieved. A virtual force that acts on a focused lattice point in the equipment-independent color space is defined, and a position at which the focused lattice point is located in a steady-state in which the virtual force acts on the focused lattice point is calculated. The reference profile is referenced in order to retrieve a lattice point in the equipment-dependent color space associated with the position of the steady-state focused lattice point. A profile is created by associating the position of each steady-state focused lattice point with a lattice point in the equipment-dependent color space.

13 Claims, 9 Drawing Sheets

U.S. PATENT DOCUMENTS

2004/0263880 A1    12/2004   Ito et al.
2004/0263881 A1*   12/2004   Ito et al. ...................... 358/1.9
2005/0128498 A1*    6/2005   Matsuzaki .................. 358/1.9

FOREIGN PATENT DOCUMENTS

| JP | 2003-116012 | 4/2003 |
|---|---|---|
| JP | 2004-320624 | 11/2004 |
| JP | 2004-320625 | 11/2004 |
| JP | 2004-320626 | 11/2004 |

OTHER PUBLICATIONS

Abstract of Japanese Patent Publication No. 2003-116012, Pub. Date: Apr. 18, 2003, Patent Abstracts of Japan.
Abstract of Japanese Patent Publication No. 2004-320624, Pub. Date: Nov. 11, 2004, Patent Abstracts of Japan.
Abstract of Japanese Patent Publication No. 2004-320625, Pub. Date: Nov. 11, 2004, Patent Abstracts of Japan.
Abstract of Japanese Patent Publication No. 2004-320626, Pub. Date: Nov. 11, 2004, Patent Abstracts of Japan.

* cited by examiner

SMOOTHING OF DISPOSITIONS OF LATTICE POINTS FOR CREATION OF PROFILE

The entire disclosure of Japanese Patent Application No. 2005-5072, filed on Jan. 12, 2005, is expressly incorporated by reference herein.

BACKGROUND OF THE INVENTION

1. Field of the Invention

The present invention relates to a technology of smoothing dispositions of lattice points for the purpose of creation of a profile.

2. Description of the Related Art

Image equipment such as a display or a printer supports color image data each of whose pixels signifies a color by representing shades of color components on respective gray scales. For example, colors are defined in any of various color spaces including an RGB color space defining three colors of red, green, and blue and a CMY color space defining cyan, magenta, and yellow (including light cyan, light magenta, dark yellow, and black). The definitions of colors are used as color image data. The colors are generally dependent on or inherent to image equipment. A color correction lookup table specifying the relationships of correspondences between sets of colors supported by one piece of equipment and sets of colors supported by another piece of equipment is employed so that the same image can be outputted in the same colors among various pieces of image equipment.

Because of a restricted storage capacity and the workability in creating the color correction lookup table, it is unfeasible to create the color correction lookup table that specifies the relationships of correspondences of all sets of colors supported by one piece of image equipment with those supported by another piece of image equipment. Normally, the relationships of correspondences of a specific number of typical colors supported by one piece of image equipment with those supported by another piece of image equipment are specified in the color correction lookup table. The relationships of correspondences of the other colors are calculated through interpolation. Namely, colorimetry is not performed on numerous colors but is performed on a measurable number of colors generated from image equipment. The color correction lookup table thus specifies the relationships of correspondences of a specific number of typical colors.

Precision in interpolation depends on the dispositions of lattice points that are defined in a color space in order to represent typical colors specified in a color correction lookup table. Namely, data items to be represented by a lattice point are interpolated using data items represented by lattice points adjoining the lattice point that is an object of interpolation. Unless lattice points are disposed smoothly, the precision in interpolation is degraded. This raises the possibility that a tone jump or a color twist may occur. A technology for smoothing the dispositions of lattice points has been known (refer to, for example, Japanese Unexamined Patent Publication No. 2003-116012). Namely, conventionally, the relationships of a certain lattice point to its surrounding lattice points are smoothed using a three-dimensional filter in order to determine the positions of lattice points in an RGB or CMY color space.

The conventional smoothing has difficulty in maintaining a color gamut over a period before or after smoothing is performed, or in determining smooth lattice points as a whole while confining a specific lattice point to a specific position. Specifically, when a color correction lookup table is created, while lattice points that are located on the boundary of a color gamut are held intact, other lattice points must be smoothly disposed in order to define as large a color gamut as possible. Moreover, when gray or any other specific color is maintained, while lattice points are disposed along an axis signifying gray, surrounding lattice points must be smoothly disposed in relation to the lattice points disposed on the gray axis. However, even when a weighted mean is calculated according to whether smoothing is performed or not in the same manner as it is in the related art, the weighted mean does not always relate to an ideal position. Lattice points cannot be smoothly disposed while various conditions are satisfied, that is, while a color gamut is held intact and a desired lattice point is fixed to a position at which the lattice point signifies a desired color.

SUMMARY OF THE INVENTION

The present invention addresses the foregoing problems. An object of the invention is to provide a smoothing technology for reliably smoothing the dispositions of lattice points and taking account of various conditions if necessary.

In order to accomplish the above object, a virtual force that acts on a lattice point is defined. The lattice point shall be moved by the virtual force. A lattice point having become steady-state shall be a smoothed lattice point. Specifically, once each lattice point defined in an equipment-independent color space is regarded as a focused lattice point and a virtual force is defined for the lattice point, the movement of each lattice point by the virtual force can be simulated. When the virtual force acts on each lattice point, if the lattice point reaches a steady-state in which the position of the lattice point will not shift any more, the virtual force acting on each lattice point is substantially balanced with another force. This results in an orderly state.

According to an aspect of the invention, the positions of lattice points put in an orderly state are utilized as the positions of lattice points to be specified in a profile. When the positions of the lattice points determined through simulation are employed, interpolation can be achieved highly precisely. This means that the dispositions of lattice points have been smoothed through the simulation. Therefore, virtual forces are applied to lattice points that are defined in an equipment-independent color space, that are specified in a reference profile, and that are not smoothed, whereby the lattice points are settled down. A smoothed profile can be created based on the positions of the steady-state lattice points.

According to another aspect of the invention, a profile to be created is a profile associating lattice points defined in an equipment-dependent color space with lattice points defined in an equipment-independent color space. Specifically, each of the lattice points defined in the equipment-dependent color space represents gray levels representing shades of color components. However, a color is not exactly identified merely by identifying a set of gray levels. On the other hand, each of the lattice points defined in the equipment-independent color space represents gray levels representing shades of color components defined in the equipment-independent color space. A color is exactly identified with a set of gray levels. Consequently, the profile associating the lattice points in the equipment-dependent color space with those in the equipment-independent color space is used to identify a color signified by a lattice point in the equipment-dependent color space. The profile is created based on the positions of steady-state focused lattice points, and can therefore be regarded as a smoothed profile.

On the other hand, a reference profile is a profile associating a plurality of lattice points defined in the equipment-dependent color space with those defined in the equipment-independent color space. In the reference profile, the dispositions of the lattice points in the equipment-independent color space are not smoothed. Namely, the reference profile is a profile created with no consideration taken into a degree of smoothness in the disposition of each lattice point. For example, the lattice points in the equipment-dependent color space are determined according to specific rules, and associated lattice points in the equipment-independent color space (that is, lattice points signifying output colors) are identified. Since the work does not take account of a degree of smoothness in the disposition of each lattice point in the equipment-independent color space, the reference profile created is unsmoothed.

The degree of smoothness in the disposition of each lattice point is synonymous with a degree of distortion in the arrangement of lattice points in a space. For example, when lattice points are arrayed in the form of a cubic lattice in an equipment-independent color space, the cubic lattice is not distorted. When the lattice points are deviated from the positions thereof in the cubic lattice, the cubic lattice is distorted. When the lattice points are equidistantly arrayed in the equipment-independent color space, the degree of smoothness is high. Moreover, when a curve linking adjoining lattice points in the equipment-independent color space, that is, a curve linking one boundary of a color gamut, which is defined in the equipment-independent color space, and the other boundary thereof is expressed with a high-order function, the degree of smoothness is low.

In general, when a color is interpolated, if lattice points orderly arrayed in a color space are referenced in order to interpolate lattice points in other color space, the interpolation can be achieved with the precision in interpolation not varied depending on a local position in the color space. Consequently, when the positions of lattice points are smoothed according to the invention, the lattice points in the equipment-independent color space can be referenced in order to calculate lattice points in an equipment-dependent color space with improved precision.

A plurality of lattice points defined in the equipment-dependent color space and specified in the reference profile may represent sets of data items defined in a color system actually employed in image equipment, or sets of data items associating the sets of data items, each of which represents three or more dimensions, with the sets of data items defined in the color system actually employed in the image equipment. The sets of data items defined in the color system actually employed in the image equipment may be sets of data items defined in a CMY color space employed in a printer. The sets of data items associating the sets of data items, each of which represents three or more dimensions, with the sets of data items defined in the color system employed in the image equipment may be sets of data items associating sets of gray levels, each of which represents shades of red, green, and blue, with the sets of data items defined in the CMY color space.

As long as the gray levels representing shades of red, green, and blue are associated with gray levels, which represent shades of cyan, magenta, yellow, black, light cyan, and light magenta, according to a predetermined rule (for example, a rule for color separation, granularity, or a rule determined in consideration of an amount of used ink), colors to be printed according to gray levels of cyan, magenta, yellow, black, light cyan, and light magenta can be defined in the equipment-independent color space. The association can be adopted as a reference profile. In this case, the reference profile associates data items of red, green, and blue with data items defined in the equipment-independent color space. At the same time, the data items of red, green, and blue can be converted into the gray levels of cyan, magenta, yellow, black, light cyan, and light magenta according to the above rule.

According to another aspect of the invention, a smoothed profile is created merely by referencing the reference profile after the lattice points in the equipment-independent color space have become steady-state. The data items of red, green, and blue specified in the reference profile are used to identify positions of lattice points in the equipment-independent color space. Consequently, the data items of red, green, and blue are not limited to the data items associated with data items defined in any color system (a red (R), green (G), and blue (B) color system in the above example), but may be any data items as long as the data items represent three or more dimensions. Preferably, the data items are those representing three dimensions for easy processing.

Moreover, when the reference profile associates the lattice points in the equipment-dependent color space with the lattice points in the equipment-independent color space, any of various techniques can be adopted. For example, colorimetry may be performed on an actual output of image equipment in order to detect lattice points in the equipment-independent color space. Otherwise, the actual output is not used but simulation may be performed in order to detect lattice points in the equipment-dependent color space. As the simulation, the spectral reflectance levels of a recording material, with which a recording medium is recorded according to data items represented by each of the lattice points in the equipment-dependent color space, and the recording medium respectively may be simulated. In order to determine the relationships of correspondences of a plurality of lattice points, the relationships of correspondences of a predetermined number of lattice points may be detected, and the relationships of correspondences of a larger number of lattice points may be interpolated.

As for the profile, the profile should merely be able to specify the relationships of correspondences of lattice points in a color system space with those in another color space. A table defining the relationships of correspondences of a plurality of lattice points will do. Otherwise, a function defining the relationships of correspondences of lattice points will do. Various techniques may be adopted.

The initial position of a focused lattice point is not especially limited to any specific ones. The position of any of the lattice points in the equipment-independent color space specified in the reference profile may be adopted, or a position of a lattice point may be detected by interpolating data items represented by the lattice points. In either case, a plurality of lattice points in the equipment-independent color space is regarded as focused lattice points, and virtual forces are defined. The motions of the lattice points must be ceased along with the passage of time. The virtual force is therefore a force dependent on the position of the lattice point and the time.

After each lattice point becomes steady-state, the lattice point is associated with a lattice point in the equipment-dependent color space. This results in a profile employed in the invention. In this case, the reference profile is referenced. However, the lattice points defined in the equipment-independent color space and specified in the reference profile are unsmoothed as mentioned above. Therefore, when the reference profile is referenced for the purpose of interpolation, even if data items represented by each of the lattice points in the equipment-independent color space are regarded as independent variables, and data items represented by each of the lattice points in the equipment-dependent color space are regarded as dependent variables, the interpolation cannot be achieved accurately. Therefore, the data items represented by each of the lattice points in the equipment-dependent color space are regarded as independent variables, and the data items represented by each of the lattice points in the equipment-independent color space are regarded as dependent variables. Lattice points associated with steady-state lattice points are calculated. The calculation is implemented by performing known numerical calculation.

A virtual force acting on a focused lattice point is requested to merely shift the position of the lattice point so as to bring the lattice point to a steady-state, so that the disposition of the lattice point will be smoothed. Therefore, any of various forces may be adopted. The virtual force should preferably be a force dependent on the positional relationship of a focused lattice point relative to an adjoining lattice point. For example, a force whose magnitude varies to monotonously increase proportionally to a distance of the focused lattice point from an adjoining lattice point can be adopted. The force causes adjoining lattice points to attract each other.

When the force is applied to a focused lattice point, the focused lattice point is attracted by a plurality of adjoining lattice points. Consequently, the position of the focused lattice point shifts. When a resultant force of forces gets smaller due to the relationships to the adjoining lattice points, the force causing the focused lattice point to move diminishes. The focused point therefore becomes steady-state shortly. The force may be any of various forces. For example, a force proportional to a distance may be adopted. The force is a force that is analogous to a vibration of a spring occurring in nature. Therefore, the lattice point will behave like the vibration. When the lattice point shifts its position while vibrating, compared with when the lattice point rectilinearly moves, a distortion of a force can be readily alleviated. Consequently, the lattice point more reliably makes a transition to a steady-state. Preferably, the force is oriented in directions in which lattice points are attracted to join. In case where the force is applied to a lattice point, when the lattice point becomes steady-state, it is rectilinearly juxtaposed with other lattice points, or becomes geometrically symmetric with adjoining lattice points. Consequently, the disposition of the lattice point can be more effectively smoothed.

Furthermore, the virtual force may be a resistance causing a lattice point to stop along with the passage of time. For example, a resistance whose magnitude is proportional to a speed at which a focused lattice point moves may be adopted. The force acts on a material point in the natural world. When the force is adopted, the movement of a lattice point can be simulated as a motion analogous to the behavior of the material point in the natural world.

Furthermore, even when the positions of a plurality of lattice points are shifted, one of the lattice points may preferably be fixed. For example, assume that a lattice point located between vertexes of a color gamut is focused. At this time, the lattice points corresponding to the vertexes of the color gamuts and the focused lattice points are fixed, and lattice points existent among the vertexes and focused lattice points are freely movable for the purpose of smoothing. On the other hand, if attractions acting in directions in which adjoining lattice points are attracted to join are a major component of a virtual force, the fixed lattice points and the other lattice points which have become steady-state are expressed with a broken line linking the focused point and vertexes with segments.

When the focused point and vertexes are linked, if the three lattice points are fixed, the linkage should preferably be expressed with a curve linking the points smoothly. Namely, even when a focused lattice point or any other lattice point is fixed, a virtual force should preferably be defined in order to attain a desired steady-state. For example, assuming that a virtual force acts on a lattice point adjoining a focused lattice point, a force opposite to the virtual force may be contained in a virtual force that acts on the focused lattice point. When the force acts on the focused lattice point, even if lattice points are not juxtaposed in the form of a broken line and a resultant force of attractions acting in directions in which lattice points are attracted to join is not 0, a resultant force of components of the virtual force acting on the focused lattice point is balanced. Consequently, even if lattice points are not rectilinearly juxtaposed, a steady-state in which the lattice points are stopped can be attained.

As mentioned above, when all focused lattice points on which virtual forces are acting are moved, the lattice points become steady-state. For simulation of this mechanism, a formula describing a motion caused by a virtual force may be adopted. Specifically, once a virtual force to be applied to each focused lattice point whose position is identified can be defined, the speed of the motion and the position of the focused lattice point can be described by an equation of motion.

Moreover, a virtual force may vary depending on the position of a focused lattice point or a time. The formula describing the speed and position is modified to consider the passage of a microscopic time. Consequently, the position of the focused lattice point and the speed of the motion thereof attained after the elapse of the microscopic time are calculated. A virtual force to be attained after the elapse of the microscopic time is defined, and the formula describing the speed of the motion and the position of a lattice point is used to calculate a change in the position of a lattice point and a change in the speed of the motion thereof which occur along with the passage of time. Consequently, whether a lattice point has become steady-state can be determined by checking if the speed of the motion made by the lattice point meets a predetermined condition.

According to another aspect of the invention, a profile making it possible to convert data items defined in one color system into data items defined in another color system is created. Preferably, lattice points are confined to desired position so that they can be specified in the profile. For example, the positions of lattice points defined in an equipment-independent color space may be confined to the inside of a color gamut (including a boundary line or boundary surface). The color gamut is defined as a domain included in the equipment-independent color space and associated with arbitrary lattice points that are defined in an equipment-dependent color space and that are specified in a reference profile. The positions of focused lattice points are modified so that they will fall within the domain that is included in the equipment-independent color space and that contains lattice points into which the arbitrary lattice points defined in the equipment-dependent color space care converted. Thus, the positions of the focused lattice points are confined to the inside of the color gamut.

For the confinement, any of various techniques can be adopted. For example, as mentioned above, when the position of a lattice point and the speed of a motion made by the lattice point are simulated on the assumption that a microscopic time has elapsed, every time the position of the lattice point to be attained after the elapse of the microscopic time is calculated, the position of the lattice point is modified. When the position of a lattice point is modified, the degree of smoothness in the disposition of the lattice point may be degraded. However, since the shift of the position of the lattice point along with the elapse of the microscopic time is very small, the degree to which the degree of smoothness is degraded by the modification can be suppressed to the greatest extent. Nevertheless, the position of a lattice point can be simulated so that if will be confined to the inside of a color gamut.

Preferably, the modification is performed so that a certain focused lattice point will be confined to a specific region in a color gamut. For this purpose, the position of the focused lattice point is modified so that the focused lattice point will approach a lattice point in the equipment-independent color space into which a lattice point in a specific region in the color gamut defined in the equipment-dependent color space is converted. In other words, when the lattice point in the specific region in the color gamut defined in the equipment-dependent color space is converted, the resultant lattice point in the equipment-independent color space is the lattice point located in the specific region in the color gamut.

Consequently, when the position of a focused lattice point is modified so that the focused lattice point will approach a lattice point resulting from conversion, the focused lattice point is confined to the specific region in the color gamut. Needless to say, the specific region is not limited to one region, but various regions may be adopted, for example, a region on a boundary line of a color gamut, a region on a boundary surface, and a domain signifying a specific color such as an achromatic color may be adopted. For determining a modified position of a focused lattice point, a formula determining the modified position is defined, and confining conditions are added to the formula. Thus, the position of a lattice point can be confined to a desired position.

The confining condition may be conditions for confining a lattice point to a region in an equipment-independent color space associated with a specific region in a color gamut defined in an equipment-dependent color space, or conditions for confining a lattice point to a predetermined region (for example, a predetermined curve) in the equipment-independent color space. Any of various conditions may be adopted.

The position of a lattice point may be modified so that every time it is modified after the elapse of a microscopic time, the lattice point will be confined to a specific region in a color gamut. In order to prevent excessive modification, the position of a lattice point may be modified so that the lattice point will approach the specific region in the color gamut as closely as possible. In this case, as long as a magnitude of modification falls within a predetermined permissible range, modification causing a lattice point to move in an arbitrary direction is preferably permitted. Thus, as long as the magnitude of modification falls within the permissible range, modification can be performed freely. Consequently, a lattice point can be readily brought to a steady-state.

If the permissible range remains constant, the position of a lattice point finally attained in a steady-state may be deviated from a specific region in a color gamut. Preferably, the permissible range is narrowed along the passage of time. In this case, since the confining condition becomes stricter along with the passage of time, the position of a lattice point finally attained in the steady-state will substantially fall within the specific region in the color gamut.

A profile created as mentioned above is referenced in order to create a color correction profile defining the relationships of correspondences of lattice points defined in one color system with those defined in another color system. For example, assuming that a printer or the like is regarded as the first image equipment, and a display or the like is regarded as the second image equipment, the color correction profile specifies the relationships of correspondences of image data items treated by the first image equipment with those treated by the second image equipment. At this time, the aforesaid equipment-dependent color space is regarded as a color space in which the image data items to be treated by the first image equipment are defined.

Assuming that a predetermined standard such as the sRGB standard is adapted for the image data items to be treated by the second image equipment, the relationships of correspondences of the image data items with data items represented by lattice points in the equipment-independent color space can be determined. Consequently, when the aforesaid profile is referenced, the relationships of correspondences of the image data items to be treated by the first image equipment with the image data items to be treated by the second image equipment can be readily specified in order to create a color correction profile.

The aspects of the invention can be implemented not only in a method but also in a system. The invention may be implemented in a program product that executes processing according to the method. Furthermore, the invention may be adapted to a printing control system, method, or program product that convert colors from one colors to others by referencing the color correction profile.

When the aspects of the invention are adapted to a printing control system that performs color conversion, the printing control system performs color conversion by referencing a color correction profile for the purpose of printing.

Herein, a reference profile associating a plurality of lattice points defined in an equipment-dependent color space with lattice points defined in an equipment-independent color space is retrieved. A virtual force acting on a focused lattice point in the equipment-independent color space is defined. A position at which the focused lattice point is located in a steady-state in which the virtual force acts on the focused lattice point is calculated. A lattice point in the equipment-dependent color space associated with the position at which the focused lattice point is located in the steady-state is retrieved from the reference profile. A profile is created by associating the position of each steady-state focused lattice point with a lattice point in the equipment-dependent color space. The profile is used to create a color correction profile that is data specifying the relationships of correspondences of image data items to be treated by first image equipment with image data items to be treated by second image equipment.

When the aspects of the invention are adapted to a printing control method of performing color conversion, the printing control method is such that color conversion is performed by referencing a color correction profile and printing is then performed.

Herein, a reference profile associating a plurality of lattice points defined in an equipment-dependent color space with lattice points defined in an equipment-independent color space is retrieved. A virtual force acting on a focused lattice point in the equipment-independent color space is defined. A position at which the focused lattice point is located in a steady-state in which the virtual force acts on the focused lattice point is calculated. A lattice point in the equipment-dependent color space associated with the position at which the focuses lattice point is located in the steady-state is retrieved from the reference profile. A profile is created by associating the position of each steady-state focused lattice point with a lattice point in the equipment-dependent color space. The profile is used to create data that is a color correction profile specifying the relationships of correspondences of image data items to be treated by first image equipment with image data items to be treated by second image equipment.

Furthermore, when the aspects of the invention are adapted to a printing control program product that performs color conversion, the printing control program product instructs color conversion to be performed by referencing a color correction profile and instructs execution of printing.

The printing control program product implements in a computer: an image data acquisition program code for acquiring image data items to be treated by first image equipment; a color conversion program code for retrieving a reference profile that associates a plurality of lattice points defined in an equipment-dependent color space with lattice points defined in an equipment-independent color space, defining a virtual force that acts on a focused lattice point in the equipment-independent color space, calculating a position at which the focused lattice point is located in a steady-state in which the focused lattice point enters when the virtual force acts on the focused lattice point, retrieving a lattice point in the equipment-dependent color space, which is associated with the position at which the focused lattice point is located in the steady-state, from the reference profile, creating a profile by associating the position of the focused lattice point with the lattice point in the equipment-dependent color space, using the profile to reference a color correction profile, which is created by specifying the relationships of correspondences of image data items to be treated by the first image equipment with image data items to be treated by the second image equipment, and converting colors represented by the image data items; and a printing control program code for controlling a printer according to the image data items having undergone color conversion.

A system, a method, or a program in accordance with the invention may be implemented by itself or may be incorporated in certain equipment and implemented in combination with any other system, method, or program product. The idea of the invention is not limited to the system, method, and program but encompasses various working modes and can be modified properly.

Furthermore, the aspects of the invention may be provided in the form of a recording medium in which the program in accordance with the invention is stored. The recording medium in which the program is stored may be a magnetic recording medium or a magneto-optical recording medium. The same applies to any of recording media being duly developed in the future. Moreover, a primary duplicate, a secondary duplicate, and other duplicates can be regarded in the same manner. Furthermore, a product composed of software and hardware is not inconsistent with the idea of the invention. The invention may be provided in the form of a product part of which is stored in a recording medium so that it can be read whenever needed. Moreover, all the features of the invention may not be implemented by a sole program produce but may be implemented by a plurality of program products. In this case, the features are implemented in a plurality of computers.

BRIEF DESCRIPTION OF THE DRAWINGS

Embodiments of the present invention will be described in detail based on the following figures, wherein.

DESCRIPTION OF THE PREFERRED EMBODIMENTS

Figure 1:
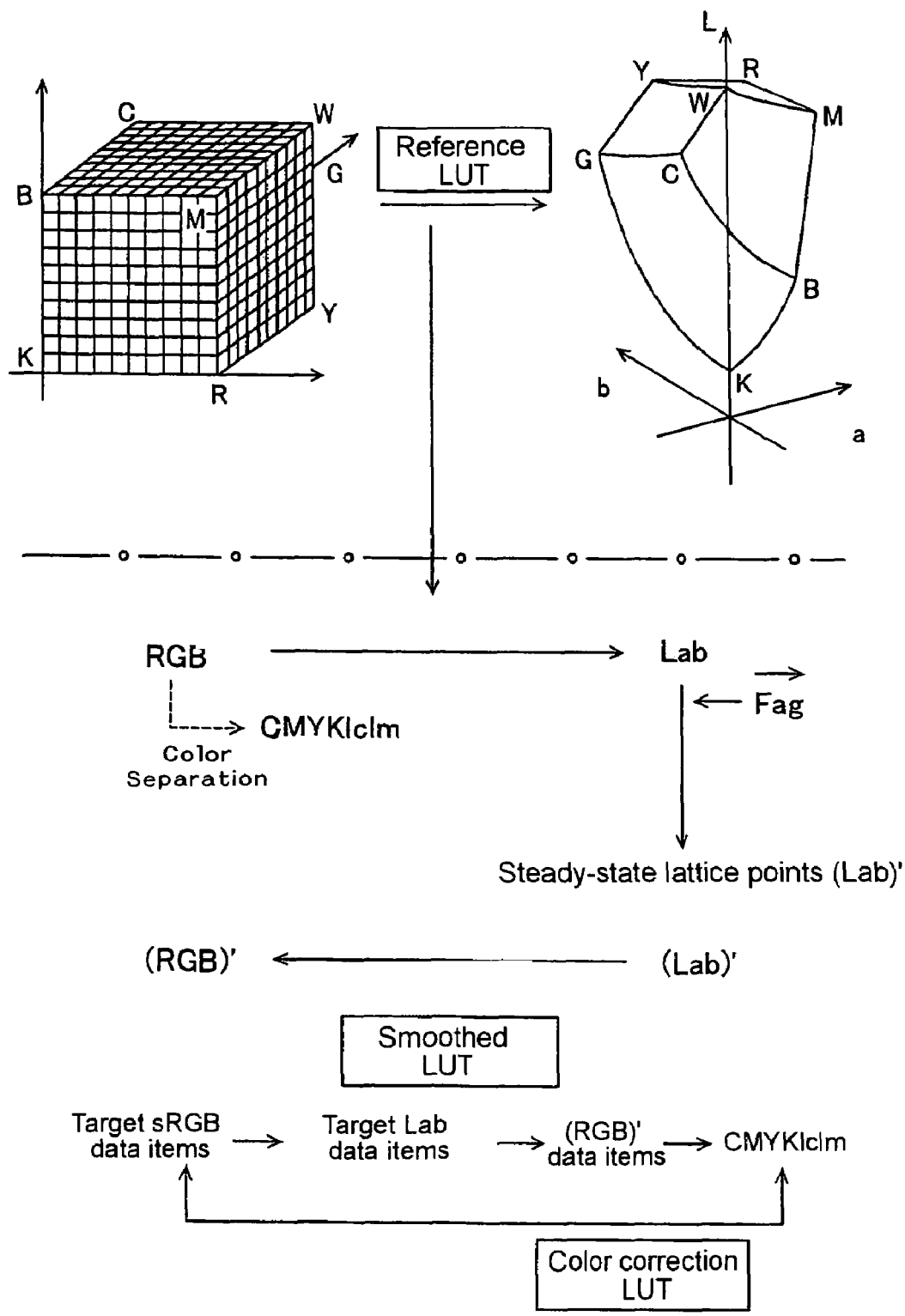
FIG. 1 is an explanatory diagram outlining a process of creating a color correction lookup table.

Embodiments of the present invention will be described by orderly discussing the following items:
(1) Overview of creation of a color correction lookup table and smoothing
(2) Color correction lookup table creation system and printing control system
(3) Smoothing
(3-1) Principles of smoothing
(3-2) Imposing confining conditions
(3-3) Smoothing procedure
(4) Other embodiments
(1) Overview of Creation of a Color Correction Lookup Table and Smoothing FIG. 1 is an explanatory diagram outlining a process of producing a color correction lookup table (hereinafter LUT) to be referenced when a printer performs printing. Since many arithmetic operations are performed at many steps included in the process, a computer is preferably employed. Moreover, when a reference LUT to be described later is created, if printing is actually performed, a printer that utilizes the created color correction LUT should be used for the printing. In half-toning to be described later, the same algorithm as the one adopted by the printer should be employed. If simulation to be described later is performed in order to create the reference LUT, the simulation should be performed on the assumption that the printer that utilizes the created color correction LUT is used for printing A color correction LUT employed in the present embodiment is a table specifying the relationships of correspondences between sRGB data items and CMYKlclm data items in relation to a plurality of reference points. The reference points are referenced in order to perform interpolation, whereby an arbitrary set of sRGB data items can be converted into a set of CMYKlclm data items. In order to create the color correction LUT, according to the present embodiment, a reference LUT is created prior to smoothing.

According to the present embodiment, while the reference LUT is referenced, smoothing is performed in order to create a smoothed LUT. The smoothed LUT resulting from the smoothing is referenced in order to create the color correction LUT. Incidentally, the reference LUT corresponds to a reference profile and the smoothed LUT corresponds to a profile resulting from smoothing in accordance with the invention. In the present embodiment, the reference LUT specifies the relationships of correspondences between sets of RGB data items that are red data, green data, and blue data representing three respective dimensions and sets of L*a*b* data items (gray levels representing shades of color components L*, a*, and b* where * may be omitted for brevity's sake) in relation to a plurality of reference points.

Each set of RGB data items specified in the reference LUT corresponds to a set of gray levels representing shades of red, green, and blue. The gray levels can be converted into CMYKlclm data items, which are data items of cyan, magenta, yellow, black, light cyan, and light magenta representing six dimensions, according to a plurality of predetermined rules. In other words, the present embodiment makes it a precondition to create a color correction LUT to be employed in performing printing using color inks of cyan, magenta, yellow, black, light cyan, and light magenta. The CMYKlclm data items are data items indicating amounts of color inks.

Herein, gray levels representing six dimensions should merely be inferred from gray levels representing three dimensions according to a plurality of rules. Namely, when the CMYKlclm data items representing six dimensions are employed, a color produced by a combination of colors of cyan, magenta, yellow, black, light cyan, and light magenta can be expressed with a different combination of gray levels representing shades of cyan, magenta, yellow, black, light cyan, and light magenta. There is difficulty in uniquely determining an ideal combination of gray levels of cyan, magenta, yellow, black, light cyan, and light magenta, which signifies a specific color, without determining any rule. If the relationships of correspondence between RGB data items and CMYKlclm data items are defined under a plurality of rules, the RGB data items can be readily associated with the CMYKlclm data items.

Once CMYKlclm data items are identified, a hue of a color to be printed based on the data items can be calculated. The reference LUT can be created by associating the hue with each set of RGB data items. As a gray scale including gray levels represented by the RGB data items or CMYKlclm data items, a gray scale (ranging from gray level 0 to gray level 255) employed in each piece of image equipment is adopted.

Moreover, since the colors of red, green, and blue and the colors of cyan, magenta, and yellow have a complementary relationship, if a color is not strictly determined with gray levels, cyan data may be defined as a difference of red data from 255, magenta data may be defined as a difference of green data from 255, and yellow data may be defined as a difference of blue data from 255. Therefore, the RGB data items in the reference LUT may be replaced with the CMY data items. As the aforesaid plurality of rules, various rules can be adopted. For example, assuming that the RGB data items are replaced with the CMY data items, one rule may stipulate that an equal value a is subtracted from each of the gray levels of cyan, magenta, and yellow. Another rule may stipulate that the value a subtracted from each of the gray levels of cyan, magenta, and yellow is replaced with the gray levels of black, and the remainder of each of the gray levels of cyan and magenta is replaced with a gray level of light cyan or light magenta at a certain ratio. A rule for color separation may be adopted so that each of the gray levels of cyan, magenta, and yellow is replaced with an equivalent value among the gray levels of cyan, magenta, yellow, black, light cyan, and light magenta.

Furthermore, the gray levels of cyan, magenta, yellow, black, light cyan, and light magenta determine amounts of color inks to be used. Therefore, the gray levels of cyan, magenta, yellow, black, light cyan, and light magenta are determined by imposing a condition that use of inks should be limited, that is, the weight of each ink to be shot to a unit area should be limited to a specific weight or less, and a condition that generation of each ink should be limited, that is, an amount of a specific ink to be used is limited in order to suppress granularity or to minimize a difference in a degree of color development of one light source from another. Moreover, when a larger number of colors can be expressed by combining inks of cyan, magenta, yellow, black, light cyan, and light magenta, it is preferred in terms of improvement in image quality. Therefore, a color gamut is defined as widely as possible.

In order to calculate a hue of a color signified by each set of CMYKlclm data items, various techniques can be adopted. For example, a plurality of patches each having a predetermined area may be printed based on the CMYKlclm data items, and then calorimetrically measured. The size, shape, and position of a recording material shot to paper according to the CMYKlclm data items may be predicted and the color may be simulated based on the spectral reflectance of the recording material from the paper. After a predetermined number of patches may be calorimetrically measured and the colors are simulated, RGB data items or the CMYKlclm data items may be interpolated in order to calculate Lab data items. As mentioned above, the reference LUT is a table associating sets of RGB data items with sets of Lab data items. As long as predetermined rules are satisfied, the RGB data items can be converted into the CMYKlclm data items. Preferably, the reference LUT also describes the relationships of correspondences between the sets of RGB data items and sets of CMYKlclm data items.

In order to create the reference LUT, first, RGB data items are designated. Thereafter, Lab data items are determined based on CMYKlclm data items. Consequently, arbitrary values can be designated as gray levels that will represent the shades of the RGB data items. Gray levels associated with each of lattice points equidistantly arrayed in an orthogonal three-dimensional space (RGB space) can be selected. However, lattice points associated with sets of Lab data items specified in the reference LUT are not always orderly arrayed in a Lab space, but are generally arrayed in a distorted manner. Interpolation for converting the RGB data items into the Lab data items can be accurately performed, but interpolation for converting the Lab data items into the RGB data items cannot be performed precisely.

When gray levels of color components L, a, and b are represented by each lattice point in a Lab space, a three-dimensional shape formed with lattice points in the Lab space suffers poor symmetry and the lattice points are disorderly arrayed. The directions and lengths of segments linking pairs of lattice points change disorderly. In other words, the dispositions of the lattice points suffer a low degree of smoothness. Whichever of various interpolations including linear interpolation and spline interpolation is used to create a color correction LUT, a color signified by a lattice point to be interpolated is calculated using colors signified by lattice points existing around the lattice point whose color is to be interpolated.

Therefore, if the degree of smoothness in the disposition of a lattice point is low, the precision of interpolation is low. If the precision of interpolation is low, the associations between sets of sRGB data items and sets of CMYKlclm data items cannot be highly precisely specified in a final color correction LUT. This leads to low precision in color conversion to be performed for printing. Moreover, the smoothness in the dispositions of lattice points each representing Lab data items specified in the reference LUT is not uniform as a whole. In this case, the precision in interpolation varies in a color space. Assuming that a color correction LUT is created in these circumstances in order to perform printing, when an image showing gradation or a continuous change of colors is printed, the colors are not smoothly changed. High-image quality printing fails. According to the invention, after smoothing is performed so that RGB data items can be highly precisely inferred from Lab data items, the color correction LUT is created.

The smoothing is to smooth the dispositions of lattice points in a Lab space each of which represents gray levels of color components L, a, and b specified in the reference LUT. For the reference LUT, arbitrary RGB data items can be selected. Therefore, the RGB data items are determined so that a pitch between adjoining ones of lattice points each of which represents gray levels of red, green, and blue will remain constant and the lattice points will be cubic lattice points in a RGB color space, which is an orthogonal three-dimensional space, as shown in the left upper part of FIG. 1. The dispositions of the cubic lattice points have no distortion and can be said to be highly smooth.

On the other hand, lattice points defined in a Lab space according to associated Lab data items are distorted. Specifically, the right upper part of FIG. 1 shows a color gamut defined in the Lab space. As illustrated, the color gamut in the Lab space has an irregular shape, and the dispositions of the lattice points is less smooth (the dispositions of the lattice points within the color gamut are also distorted). When smoothing is performed according to the present embodiment, lattice points each representing Lab data items specified in the reference LUT are smoothed in the Lab space in order to create an LUT having lattice points disposed therein with a high degree of smoothness (the LUT shall be referred to as a smoothed LUT in this specification).

The lower part of FIG. 1 shows the outline of processing to be performed in order to create a color correction LUT using a reference LUT. According to the present embodiment, an idea of a virtual force (vector $Fa_g$) that will act on each lattice point representing Lab data items specified in the reference LUT is introduced. On the assumption that the virtual force acts on each lattice point, the movement of each lattice point is simulated. The simulation is repeated until the speed of the motion made by the lattice point becomes sufficiently small (the lattice point becomes steady-state). According to the invention, the major component of the virtual force is a force proportional to the distance of each lattice point from an adjoining lattice point. When a majority of lattice points is substantially stopped with the virtual force applied to each of the lattice points, the lattice points are said to become steady-state.

The steady-state lattice points are quite orderly arrayed relative to adjoining lattice points, and the dispositions of the lattice points exhibit a very high degree of smoothness. Therefore, lattice points (RGB)' in an RGB space associated with lattice points (Lab)' in a Lab space that are retrieved from the reference LUT and are steady-state are calculated. (As detailed later, when the reference LUT is referenced to perform numerical calculation, if RGB data items are converted into Lab data items, lattice points (RGB) associated with lattice points (Lab)' can be calculated highly precisely.) Once the relationships of correspondences of a plurality of lattice points to the other plurality of lattice points are established, sets of data items representing the relationships of correspondences are regarded as a smoothed LUT. Consequently, RGB data items can be interpolated highly precisely using Lab data items.

The color correction LUT is composed of sets of data items specifying the correspondences of sets of sRGB data items with sets of CMYKlclm data items. The smoothed LUT is referenced to retrieve RGB data items (not the sRGB data items) in relation to Lab data items. The CMYKlclm data items can be retrieved in relation to the RGB data items. Once the sRGB data items to be specified in the color correction LUT are designated, the color correction LUT can be created.

The sRGB data items to be represented by each of reference points registered in the color correction LUT are predetermined (in the present embodiment, the sRGB data items shall be called targets). Lab values associated with sRGB data items can be calculated according to a known formula. In other words, Lab values associated with the targets can be readily obtained. The Lab values are regarded as target Lab values in order to reference the smoothed LUT, whereby RGB data items ((RGB)') associated with the target Lab values and specified in the reference LUT can be calculated. Since the RGB data items are associated with CMYKlclm data items, when the CMYKlclm data items are associated with the target sRGB data items, the color correction LUT can be created.

In the present embodiment, before RGB data items to be specified in the smoothed LUT are calculated from target Lab values, a gamut may be mapped. Specifically, since the size of a color gamut of colors to be expressed with sRGB data items is different from the size of a color gamut of colors to be expressed by the RGB data items specified in the smoothed LUT, mapping is performed in order to agree the sizes with each other. Any correction other than the gamut mapping may be adopted. Since a human-memorized color is different from an actual color, for example, a human being tends to memorize the color of the sky or a flesh color more brightly than the actual color, a color may be corrected to become close to a human-memorized color.

(2) Color Correction LUT Creation System and Printing Control System

Figure 2:
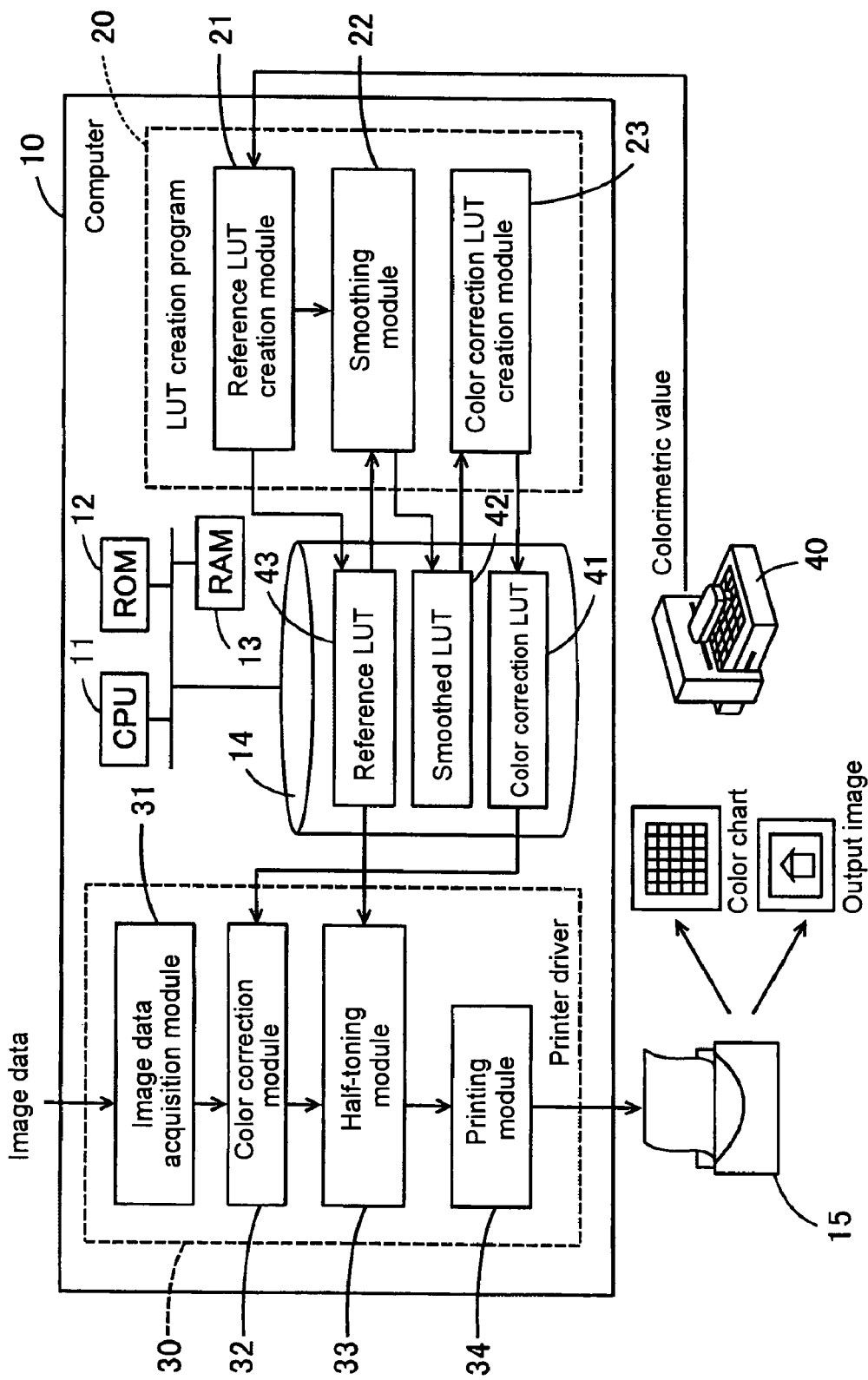
FIG. 2 is a block diagram showing hardware and software configurations.

Next, a description will be made of a system that creates a profile by performing smoothing according to the invention and then creating a color correction LUT from the profile, and a printing control system that controls printing using the color correction LUT. FIG. 2 is a block diagram showing the hardware and software configurations of a system. The system in accordance with the present embodiment is realized with a general-purpose computer. Stand-alone computers may be used to create a profile, create a color correction LUT, or control printing.

A computer 10 includes a CPU 11 that mainly performs arithmetic and logic operations. The CPU 11 controls the entire computer 10 over a system bus. A ROM 12, a RAM 13, a hard disk 14, and a universal serial bus (USB)-compatible interface, a cathode-ray tube (CRT) interface, and an input equipment interface which are not shown are interconnected over the system bus.

An operating system (OS), an LUT creation program 20 that creates a color correction LUT, a printer driver (PRT-DRV) 30 that enables printing of an image are installed as software in the hard disk 14. The software packages are transferred to the RAM 13 by the CPU 11 and then run. The CPU 11 accesses the RAM 12 and uses it as a temporary work area so as to run various programs under the control of the OS.

A keyboard and a mouse which are not shown are connected as operating input equipment via the input equipment interface. A display is connected via the CRT interface. The computer 10 can receive the contents of a manipulation performed on the keyboard or mouse, and display various pieces of information on the display. A printer 15 is connected via the USB-compatible interface. The printer can print an image according to data sent from the computer 10. An interface via which the computer is connected to the printer 15 is not limited to the USB-compatible interface but may be a parallel interface, a serial interface, or a small computer system interface (SCSI). Various connection forms may be adopted. The same applies to any connection form that is currently under development.

Next, a description will be made of processing to be performed in a case where the computer 10 functions as a printing control system in accordance with the invention. The computer 10 acquires image data, which is employed in various pieces of image equipment including image input equipment such as a scanner, a digital still camera, or a video camera and image output equipment such as a display or a projection, performs color conversion using a color correction LUT, and performs printing using the printer 15. When different pieces of equipment such as an image input device and an image output device treat the same image and the pieces of equipment adopt different color spaces so as to define colors expressed by respective pixels included in image data, the color correction LUT is used to perform color conversion.

In order to perform printing using the color correction LUT, the computer 10 employed in the present embodiment includes, as shown in FIG. 2, the printer driver 30 that treats data for printing. The printer driver 30 includes an image data acquisition module 34, a color correction module 32, a half-toning module 33, and a printing module 34. The image data acquisition module 31 acquires image data representing an image to be printed. If the number of pixels included in acquired image data does not match the number of pixels needed for printing, the image data acquisition module 31 performs resolution conversion so as to match both the numbers of pixels. The color correction module 32 references a color correction LUT 41 stored in the hard disk 14 so as to convert a color system, based on which image data is defined, into another through interpolation. The color correction module 32 receives image data from the image data acquisition module 31 and converts one color system into another.

After the color correction module 32 performs color conversion so as to produce CMYKlclm data items, the CMYKlclm data items are transferred to the half-toning module 33. The half-toning module 33 performs half-toning so as to convert the gray levels of cyan, magenta, yellow, black, light cyan, and light magenta, which are indicated for each dot, into those of the other colors. The half-toning module 33 thus acquires halftone data that specifies whether ink droplets should be shot in order to express each pixel and specifies amounts of ink droplets to be shot in order to express each pixel. In the present embodiment, when the color correction LUT 41 is created, CMYKlclm data items associated with RGB data items specified in the reference LUT 43 may be acquired and subjected to half-toning.

The printing module 34 receives the halftone data, and rearranges values in the order that the values are used by the printer 15. Specifically, the printer 15 includes an array of jet nozzles, which is not shown, as an ink jet device. A plurality of jet nozzles is juxtaposed in a sub-scanning direction as the array of nozzles. Values concerning several dots to be juxtaposed in the sub-scanning direction are used simultaneously. The printing module 34 therefore rearranges values, which are used simultaneously and concerned with dots juxtaposed in the sub-scanning direction, so that they will be buffered in the printer 15 concurrently. After completing rearrangement, the printing module 34 appends predetermined information on a resolution of an image to the rearranged values so as to produce print data, and transmits the print data to the printer 15. Based on the print data, the printer 15 prints an image represented by the image data according to the print data, and thus produces an output image.

In the present embodiment, the LUT creation program 20 is installed in the computer 10 serving as the printing control system. The LUT creation program 20 creates the color correction LUT 41 prior to printing. The LUT creation program 20 includes a reference LUT creation module 21, a smoothing module 22, and a color correction LUT creation module 23. The reference LUT creation module 21 creates a reference LUT 43 and stores it in the hard disk 14 so that the LUT creation program 20 can create the color correction LUT 41.

The invention adopts a technique of creating the reference LUT 43 according to actually-printed patches. The reference LUT creation module 21 acquires CMYKlclm data items associated with RGB data items, in which a pitch between adjoining ones of gray levels of each color component is equalized, according to a plurality of predetermined rules. In this stage, a table associating sets of CMYKlclm data items with sets of RGB data items is stored as part of the reference LUT 43 in the hard disk 14. Printing is performed based on the CMYKlclm data items. Specifically, image data of a patch that has a predetermined area and is tinted a homogeneous color according to a plurality of sets of CMYKlclm data items is produced and transferred to the half-toning module 33. Consequently, the half-toning module 33 and printing module 34 perform the aforesaid pieces of processing, and the printer 15 prints a color chart including a plurality of patches.

A colorimeter 40 is connected to the computer 10 via an interface that is not shown. The colorimeter 40 is used to calorimetrically measure the patches contained in the color chart printed by the printer 15, and provides the computer 10 with calorimetric values such as Lab values or densities. In the color chart, the position of each patch is associated with the sets of CMYKlclm data items. The colorimetric values (Lab values) of each patch can be associated with the sets of CMYKlclm data items. The reference LUT creation module 21 associates each set of Lab values with each set of CMYKlclm data items, whereby the reference LUT 43 associating sets of Lab values with sets of RGB data items can be created.

The smoothing module 22 performs smoothing while referencing the reference LUT 43, creates a smoothed LUT 42, and stores the smoothed LUT 42 in the hard disk 14. After the smoothed LUT 42 is created, the color correction LUT creation module 23 creates the color correction LUT 41 on the basis of the smoothed LUT 42. Specifically, target Lab values are calculated based on predetermined target sRGB values. The smoothed LUT 42 is referenced in order to convert the target Lab values into RGB data items through interpolation. The RGB data items are those defined for reference at the time of crating the reference LUT 43. The reference LUT 43 is referenced in order to convert the RGB data items into CMYKlclm data items. The retrieved CMYKlclm data items are associated with the target sRGB values in order to create the color correction LUT 41. The color correction LUT 41 is then stored in the hard disk 14.

(3) Smoothing (3-1) Principles of Smoothing

Next, smoothing will be described below. To begin with, a virtual force to be applied to each lattice point according to the invention will be described below. The present embodiment makes it a precondition to apply a virtual force dependent on a distance of each of lattice points from an adjoining lattice point and a direction thereof. The movement of the lattice point due to the application of the force is permitted. Simulation is repeated until the movement of the lattice point is substantially ceased because the force is substantially balanced with another with the passage of time. In a steady-state in which the movement of each lattice point is ceased, the positions of all lattice points are determined so that the virtual force applied to each of the lattice points will be substantially balanced with another. When the lattice points are located at the positions, the lattice points are regarded to be smoothed. Thus, the positions of the lattice points enabling quite high-precision interpolation are determined.

As mentioned above, the virtual force is determined so that the position of a lattice point that substantially stops because the virtual force applied thereto is substantially balanced with another will be a smoothed position. In the present embodiment, the major component of the virtual force is an attraction determined with a direction in which an adjoining lattice point exists and a distance from the adjoining lattice point. A force provided by the formula (1) is adopted.

[Formula 1]

$$\vec{F}_g = k_p \sum_{n=1}^{N} \left( \vec{X}_{gn} - \vec{X}_g \right) \quad (1)$$

Herein, a vector X indicates the position of a lattice point, g denotes a focused lattice point, and $g_n$ denotes an adjoining lattice point where n denotes a number assigned to the adjoining lattice point. The maximum value N of the number n varies depending on the position of the focused lattice point. Moreover, $k_p$ denotes a positive constant. The focused lattice point and an adjoining lattice point are mutually attracted with forces acting in the directions of a straight line linking the points. The magnitude of the forces is proportional to the distance between the points.

Figure 3:
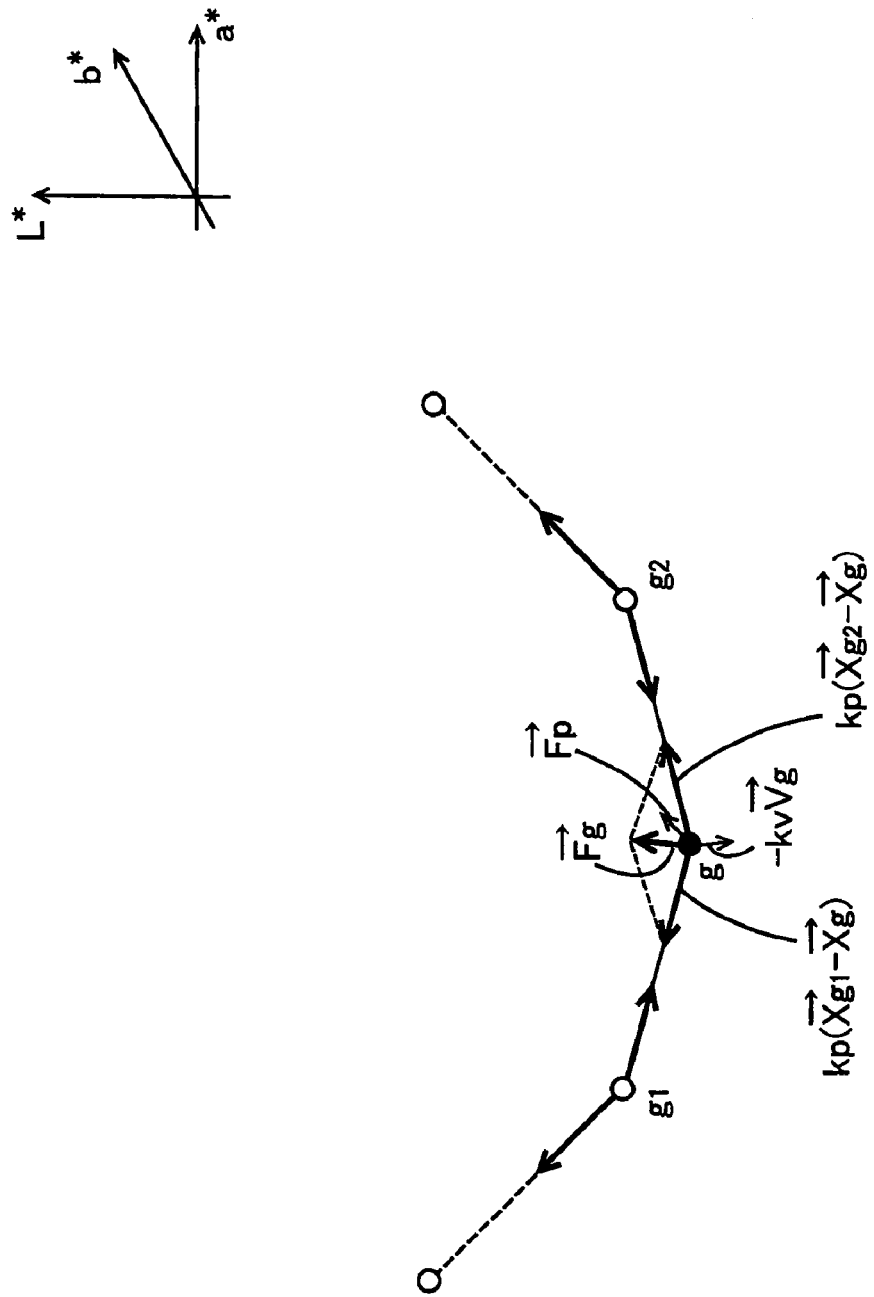
FIG. 3 is an explanatory diagram concerning a major component of a virtual force.

FIG. 3 is an explanatory diagram concerning the major component of a virtual force. In FIG. 3, black circles and open circles indicate lattice points in a Lab space. For brevity's sake, a certain lattice point (focused lattice point g) has two adjoining lattice points (adjoining lattice points $g_1$ and $g_2$). The force given by the formula (1) is analogous to a force exerted in vibrating a spring in natural world. The virtual force employed in the present embodiment uses the vibration as a model. In the present embodiment, simulation is continued until a lattice point being vibrated becomes steady-state.

In the present embodiment, the virtual force is determined based on the relationship of a focused lattice point to the adjoining lattice points. Therefore, each of lattice points defined in a Lab space must be regarded as a focused lattice point, and adjoining lattice points must be determined. The initial position of each lattice point is determined with Lab values specified in the reference LUT 43. RGB data items are orderly arrayed in an orthogonal RGB space. Fundamentally, adjoining lattice points in the orthogonal RGB space may be regarded as adjoining lattice points even in the Lab space.

However, a domain composed of lattice points in the Lab space is finite, or in other words, the lattice points form a color gamut having a predetermined shape. Therefore, adjoining lattice points on the boundary of the color gamut are identified differently from those in the color gamut. Specifically, when Lab data items that can be associated with RGB data items specified in the reference LUT 43 are plotted in the Lab space, a color gamut is defined as shown in the right upper part of FIG. 1. In the present embodiment, adjoining lattice points are identified differently among regions in the color gamut.

Figure 4:
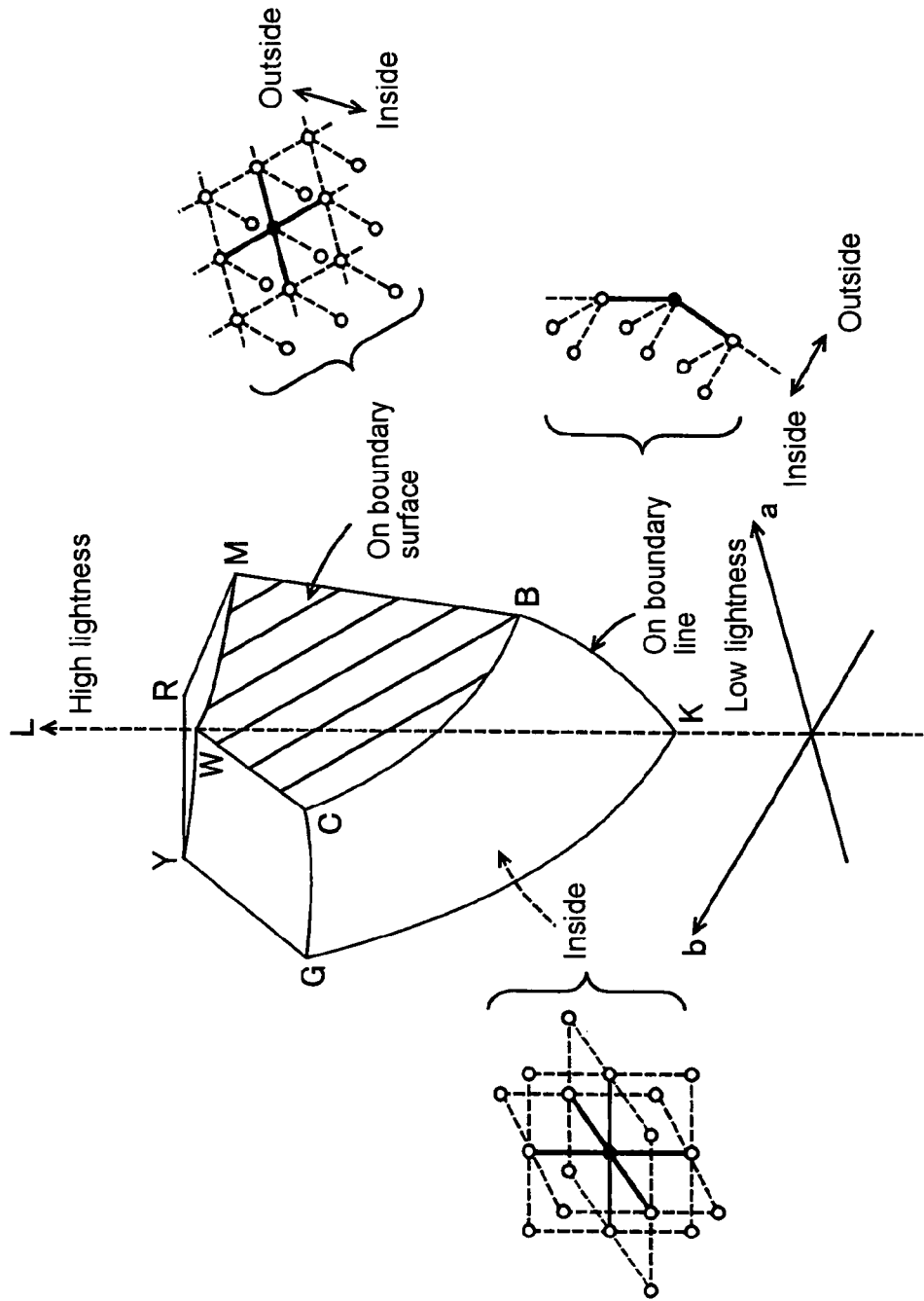
FIG. 4 shows a color gamut.

FIG. 4 shows the color gamut and signifies that adjoining lattice points are identified differently among the boundary line of the color gamut, the boundary surface thereof, and the inside thereof. FIG. 4 shows lattice points lying on the boundary line of the color gamut, the boundary surface thereof, and the inside thereof respectively. Focused lattice points are shown with black circles, and surrounding lattice points are shown with open circles. The focused lattice points are linked with adjoining lattice points with boldfaced solid lines. As for the focused lattice point inside the color gamut, an associated lattice point in an RGB space is identified, and lattice points adjoining the focused lattice point in the directions of R, G, and B axes in the RGB space are identified. Lattice points in the Lab space associated with the identified adjoining lattice points are regarded as adjoining lattice points. As shown in FIG. 4, lattice points closest to a focused lattice points in six directions are regarded as adjoining lattice points.

On the boundary line of a color space, lattice points existing on the boundary line and lattice points existing inside are located close to a focused lattice point. As illustrated, only lattice points adjoining the focused lattice point on the boundary line of the color gamut are regarded as adjoining lattice points. Namely, for a focused lattice point existent on the boundary line of the color gamut, lattice points on an edge of a cube shown in the left part of FIG. 1 which adjoin a lattice point in the RGB space associated with the focused lattice point are selected. Lattice points in the Lab space associated with the selected lattice points are identified. Thus, the lattice points adjoining the focused lattice point are determined.

On the boundary surface of a color gamut, lattice points existing on the boundary surface of the color gamut and lattice points existing inside the color gamut adjoin a focused lattice point. As illustrated, only lattice points adjoining the focused lattice point on the boundary surface of the color gamut are regarded as adjoining lattice points. Namely, when a focused lattice point is located on the boundary surface of a color gamut, lattice points existing on the surface of a cube shown in the left part of FIG. 1 which adjoin a lattice point in the RGB space associated with the focused lattice point are selected. Lattice points in the Lab space associated with the selected lattice points are identified. Thus, lattice points adjoining the focused lattice points are determined.

When a lattice point is vibrated with a force expressed with the formula (1), the lattice point moves to get smoothed with the passage of time. However, the vibration is not ceased only with the force. According to the present embodiment, a resistance expressed with the formula (2) below is applied in order to cease the vibration.

[Formula 2]

$$\vec{Fp}_g = \vec{F}_g - k_v \vec{V}_g \quad (2)$$

where a vector $Fp_g$ represents a resultant force of components of a virtual force that has already been described, a vector V represents the speed of a motion made by a lattice point, and g denotes a focused lattice point. Moreover, $k_v$ denotes a constant that should be positive. As seen from the formula (2), the focused lattice point receives a resistance whose magnitude is proportional to the speed and whose direction is opposite to a direction in which the motion is made at the speed. The resistance is equivalent to a resistance a material point in the natural world incurs while making a motion. The vibration dies away with the passage of time. Eventually, the lattice point settles down to be steady-state.

The idea of the virtual force is introduced and an equation of motion (arbitrary mass) is determined for a motion made by each lattice point. Thus, the motion of the lattice point can be described. However, in the present embodiment, the idea of another virtual force is preferably introduced so that, even when a lattice point other than those serving as vertexes of a color gamut is fixed (or substantially fixed), the fixed lattice point will not be an inflection point but will be disposed smoothly. Specifically, when the force expressed with the formula (2) is used to fix an appropriate lattice point, the fixed lattice point may become an inflection point.

Another virtual force is applied in order to permit a plurality of lattice points, which sandwich a fixed lattice point, to become steady-state without allowing the fixed lattice point to become an inflection point. Herein, a virtual force is applied so that the lattice points will become steady-state while the fixed point will not become an inflection point. In the invention, when a resultant force of virtual forces acting on respective lattice points is minimized, the lattice points are thought to be steady-state.

Figure 5:
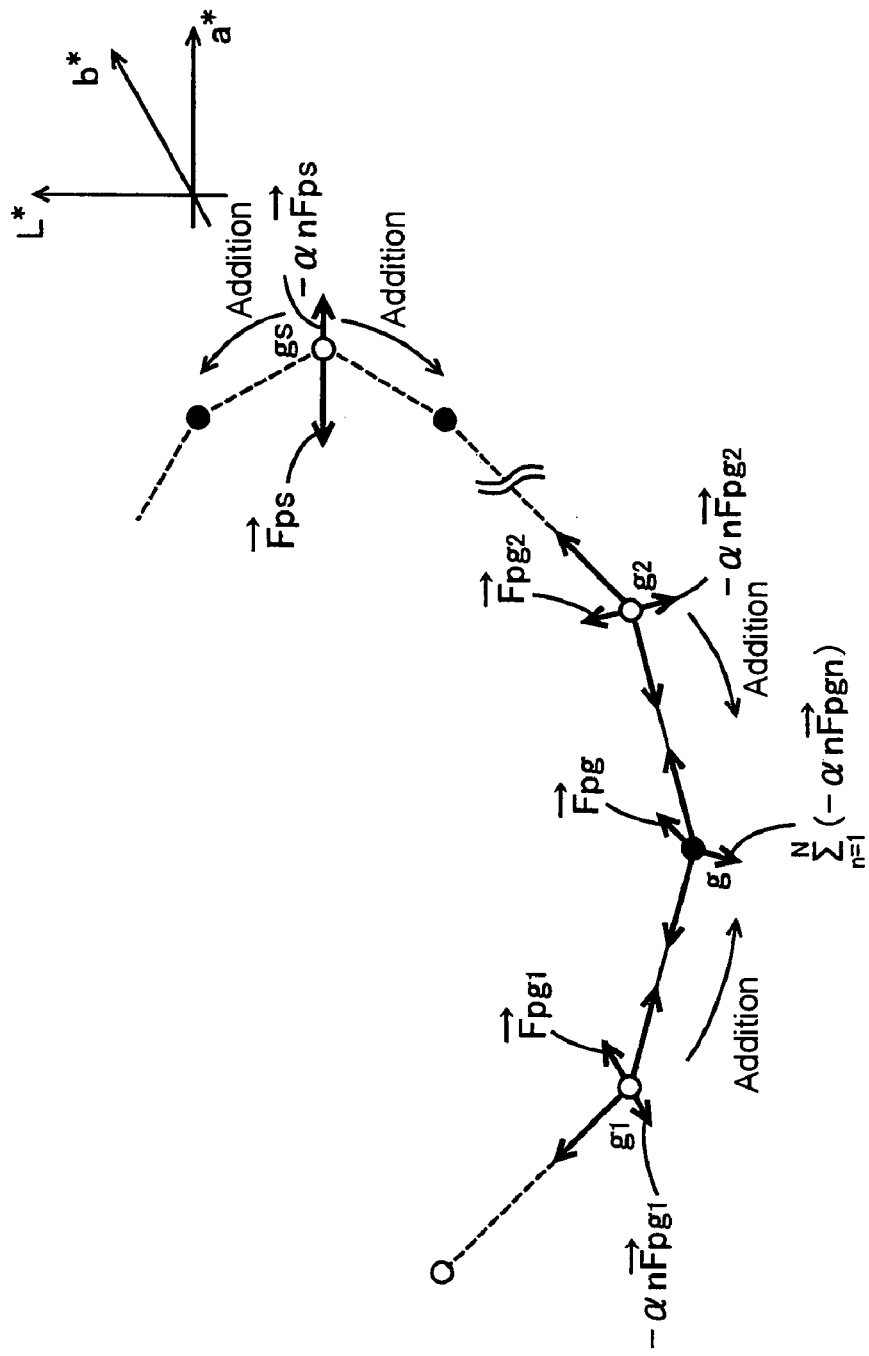
FIG. 5 is an explanatory diagram concerning forces to be applied to respective focused lattice points.

To be more specific, a virtual force acting on a certain lattice point is calculated according to the formula (2). Part of the virtual force is applied in an opposite direction to adjoining lattice points. FIG. 5 is an explanatory diagram concerning the force. FIG. 5 shows, similarly to FIG. 3 showing the dispositions of lattice points, a focused lattice point g and adjoining lattice points $g_1$ and $g_2$. Assuming that the force given by the formula (2) is applied to each of the adjoining lattice points $g_1$ and $g_2$, the forces acting on the respective adjoining lattice points $g_1$ and $g_2$ are represented by vectors $Fp_{g1}$ and $Fp_{g2}$ shown in FIG. 5.

At this time, the vectors $Fp_{g1}$ and $Fp_{g2}$ are multiplied by a coefficient $\alpha_n$ in order to calculate forces oriented in an opposite direction. A resultant force of the forces shall act on a focused lattice point $g_n$. Namely, the resultant force to be applied to each focused lattice point $g_n$ is represented by a vector $Fa_g$ expressed as the formula (3).

[Formula 3]

$$\vec{Fa_g} = \vec{Fp_g} + \sum_{n=1}^{N}\left(-\alpha_n \vec{Fp_{gn}}\right) \qquad (3)$$

Herein, a vector $Fp_g$ represents a force expressed with the formula (2) and applied to a focused lattice point g. A vector $Fp_{gn}$ represents a force expressed with the formula (2) and applied to adjoining lattice points $g_n$ where n denotes a number assigned to an adjoining lattice point. The maximum value N of the number n varies depending on the position of the focused lattice point. The coefficient $\alpha_n$ is 0 or 1. Preferably, the coefficient $\alpha_n$ varies depending on the number of adjoining lattice points so that the vector $Fa_g$ will represent an appropriate resultant force according to the number of adjoining lattice points. For example, the coefficient $\alpha_n$ is set to 1/N.

As mentioned above, a resultant force of part of components of a virtual force which act on adjoining lattice points is applied to a focused lattice point. This is effective in minimizing a resultant force of virtual forces acting on all lattice points. Moreover, the lattice points can be brought to a steady-state without allowing a fixed point to become an inflection point. For example, as shown in FIG. 5, the lattice points will enter a steady-state represented by a curved line linking the lattice points smoothly. Incidentally, not only the force expressed with the formula (3) is applied to a fixed lattice point but also a resultant force of (part of) forces applied to adjoining lattice points is applied to each of all lattice points. Consequently, even when an unintentionally substantially fixed lattice point exists in addition to an intentionally fixed lattice point, the lattice points will become smoothly steady-state.

In the present embodiment, when a certain lattice point is fixed, even if an entire system of lattice points becomes steady-state, a resultant force of components of a force applied to the fixed lattice point is not substantially nullified. However, when the force provided as the formula (3) is applied, part of the force acting on the fixed lattice point is dispersed to the adjoining lattice points, and the adjoining lattice points in turn disperse the forces to the fixed point. Consequently, a resultant force of forces acting on the entire system of lattice points is reduced, and a resultant force of the components of the force acting on the fixed point is substantially nullified. For example, in FIG. 5, $g_s$ denotes a fixed lattice point. If only the force provided as the formula (2) is applied to a lattice point, segments linking the lattice points constitute a "broken line" with the lattice point $g_s$ as an inflection point.

However, if part of a force opposite to a force acting on the lattice point $g_s$ (represented by a vector $Fp_s$) is dispersed to adjoining lattice points, the dispersed force acts on each of the adjoining lattice points so that an angle between two segments linking the lattice point $g_s$ and the adjoining lattice points will be an obtuse angle. Consequently, the segments will not form a "broken line" with the lattice point $g_s$ as an inflection point but will form a smoothly curved line. Eventually, the lattice points become steady-state. Moreover, since part of a force (force provided as the formula (2)) acting on a lattice point adjoining the lattice point $g_s$ is added to the force acting on the lattice point $g_s$, the resultant force of the force and the force represented by the vector $Fp_s$ approaches 0. Consequently, owing to the force expressed by the formula (3), even when a lattice point is fixed, lattice points become smoothly steady-state without excessive limitations imposed on the array of lattice points, that is, energy generated by an entire system of lattice points is minimized.

As mentioned above, once an equation of motion is determined on the assumption that the virtual force provided as the formula (3) acts on a focused lattice point, the lattice point is brought to a steady-state according to the equation of motion. Consequently, the disposition of the lattice point is smoothed. Specifically, the equation of motion describing a motion to be made by the focused lattice point is determined as the formula (4) presented below.

[Formula 4]

$$\vec{A_g^t} = \vec{Fp_g^t} \qquad (4)$$

where a vector $A_g^t$ represents the magnitude of an acceleration of a motion made by a lattice point g at a time instant t.

When an acceleration observed at the time instant t is calculated, a speed of a motion made by the lattice point g after the elapse of a microscopic time dt is given by the formula (5).

[Formula 5]

$$\vec{V_g^{t+dt}} = \vec{A_g^t} dt + \vec{V_g^t} \qquad (5)$$

where a vector $V_g^t$ represents the magnitude of the speed exhibited by the lattice point g at the time instant t. Incidentally, the initial speed exhibited by each lattice point may be 0 or any appropriate speed.

Once the speed observed at the time instant t is given, a position at which the lattice point g is located after the elapse of the microscopic time dt is provided by the formula (6).

[Formula 6]

$$\vec{X_g^{t+dt}} = \vec{V_g^{t+dt}} dt + \vec{X_g^t} \qquad (6)$$

where a vector $X_g^t$ indicates the position at which the lattice point g is located at the time instant t.

Namely, when a virtual force to be applied to a focused lattice point that is each lattice point is calculated according to the formula (3), the speed and position exhibited by the focused lattice point after the elapse of a microscopic time are given by the formulae (4) to (6). Consequently, after the elapse of the microscopic time is repeated, when the speeds exhibited by all lattice points become substantially 0 (for example, equal to or smaller than a predetermined threshold), the lattice points are thought to be steady-state. Thus, when simulation utilizing the idea of a virtual force is employed, all lattice points can be moved simultaneously.

In contrast, an evaluation function of evaluating a degree of smoothness in the disposition of a focused lattice point in consideration of the positional relationship of the focused lattice point to an adjoining lattice point may be employed. The evaluation to be achieved by the evaluation function may be upgraded in order to optimize the position of the focused lattice point. However, when this processing is adopted, if lattice points are sequentially treated, a certain lattice point may have the position thereof optimized but another lattice point may not have the position thereof optimized. An error occurs when one lattice point is moved in the process of optimization, and the error is accumulated with the passage of time. Eventually, the position of the other lattice point may not be able to be optimized.

Moreover, when an evaluation function of evaluating a degree of smoothness in the dispositions of all lattice points is employed, the number of degrees included in the function becomes enormous. Consequently, optimization becomes unfeasible. However, according to the invention, the idea of a virtual force is introduced. Every after a microscopic time elapses, a speed and a position are calculated. Therefore, movements made by all lattice points can be readily simulated. Consequently, all lattice points can be, as described above, simultaneously moved as simulation. A local error will not be accumulated during simulation.

(3-2) Imposing Confining Conditions

The dispositions of lattice points in an Lab space can be smoothed as mentioned above. In the present embodiment, the smoothed LUT 42 is created by specifying the relationships of correspondences between sets of RGB data items and sets of Lab data items. Therefore, the Lab data items specified in the smoothed LUT 42 must be suitable for a color conversion table. In the present embodiment, confining conditions are imposed so that the position of each lattice point can be corrected during a motion made as described in the formulae (4) to (6) every after the elapse of a microscopic time.

Various conditions can be adopted as the confining conditions. For example, conditions that confine Lab data items to a color gamut associated with a domain of RGB data items may be adopted. The color gamut is determined by varying RGB data items, that is, data items of red, green, and blue color components over an entire gray scale. Specifically, sets of gray levels of red, green, and blue are designated by varying the data items of red, green, and blue color components over the entire gray scale. Sets of Lab data items associated with the sets of gray levels are plotted in an Lab space, and a domain composed of plotted points is regarded as a color gamut supported by the printer 15.

A position at which a lattice point is located after the elapse of a microscopic time is corrected so that the position of the lattice point will be as close as possible to a lattice point representing Lab data items into which RGB data items are converted. Thus, each lattice point is confined to the color gamut. More particularly, the formula (7) presented below is optimized in order to confine each set of Lab data items to the color gamut.

[Formula 7]

$$E = |f(R,G,B) - L_t^*|^2 \qquad (7)$$

Herein, E denotes an objective function required for optimization, and a vector $L_t$ indicates a position at which a focused lattice point is located at a time instant t. Moreover, $f(R,G,B)$ is a function describing interpolation to be achieved by referencing the reference LUT 43 and providing Lab data items associated with RGB data items. During the optimization, the objective function E is minimized by varying RGB values. Consequently, RGB data items associated with Lab values are calculated so that a color difference of a color represented by the RGB data items from a color signified by a focused lattice point at the time instant t will be minimized. As the optimization, any known algorithm such as an algorithm employed in a quasi-Newton's method or a conjugate gradient method may be adopted.

The foregoing optimization may be adapted to all lattice points in a Lab space. When the optimization is performed on a lattice point existent on the boundary of a color gamut according to the formula (7), a focused lattice point is confined to the color gamut. At the same time, the relationships of correspondences between the optimized Lab data items and RGB data items can be established. When the optimization is performed on a lattice point existent in the inside of the color gamut according to the formula (7), since the lattice point originally exists in the color gamut, the role of the optimization as a means for confining a lattice point to a color gamut cannot be said to be fully filled. Nevertheless, RGB data items associated with Lab data items and represented by a lattice point at the time instant t can be retrieved.

The confining conditions may be made stricter so that Lab data items specified in the smoothed LUT 42 will be suitable for a color conversion table. For example, the number of independent variables included in the formula (7) is limited to one or two, and dependent variables are fixed to the maximum or minimum gray level. Thus, a lattice point can be confined to a boundary line or boundary surface of a color gamut. Specifically, the gray levels of red and green may be fixed to 0 in the same manner as they are in the formula (8) presented below, or the gray level of red may be fixed to 255 in the same manner as it is in the formula (9) presented below.

[Formula 8]

$$E = |f(0, 0, B) - L_t^*|^2 \qquad (8)$$

[Formula 9]

$$E = |f(255, G, B) - L_t^*|^2 \qquad (9)$$

In the formula (8), the gray levels of red and green assigned to a function $f(R,G,B)$ are 0s respectively. RGB data items are limited to those represented by any of lattice points existent on an edge linking points K and B in the left upper part of FIG. 1. Consequently, associated Lab values are limited to those represented by any of lattice points existent on a boundary line linking points K and B in the right upper part of FIG. 1. Consequently, while associated Lab values are confined to those represented by any of lattice points on the boundary line KB, optimization can be achieved.

In the formula (9), 255 is assigned as a gray level of red to the function $f(R,G,B)$. Therefore, RGB data items are limited to those represented by any of lattice points existent on a surface WMRY shown in the left upper part of FIG. 1. Associated Lab values are duly limited to those represented by any of lattice points existent on a surface WMRY shown in the right upper part of FIG. 1. Consequently, while Lab values are confined to those represented by any of lattice points existent on the surface WMRY, optimization can be achieved. Herein, the formulae (8) and (9) may not be adopted. One or two of gray levels of red, green, and blue may be fixed to the maximum or minimum value. Thus, while Lab values are confined to those represented by any of lattice points existent in the boundary line of a color gamut or the boundary surface thereof, optimization can be achieved.

Moreover, while excessive confinement is avoided, Lab data items specified in the smoothed LUT 42 can be optimized to be suitable for a color conversion table. For this purpose, confining conditions are made stricter with the passage of time that may be a microscopic time. Namely, a term describing confining conditions is added to the formula (7), and the confining conditions are made stricter with the passage of time.

Figure 6:
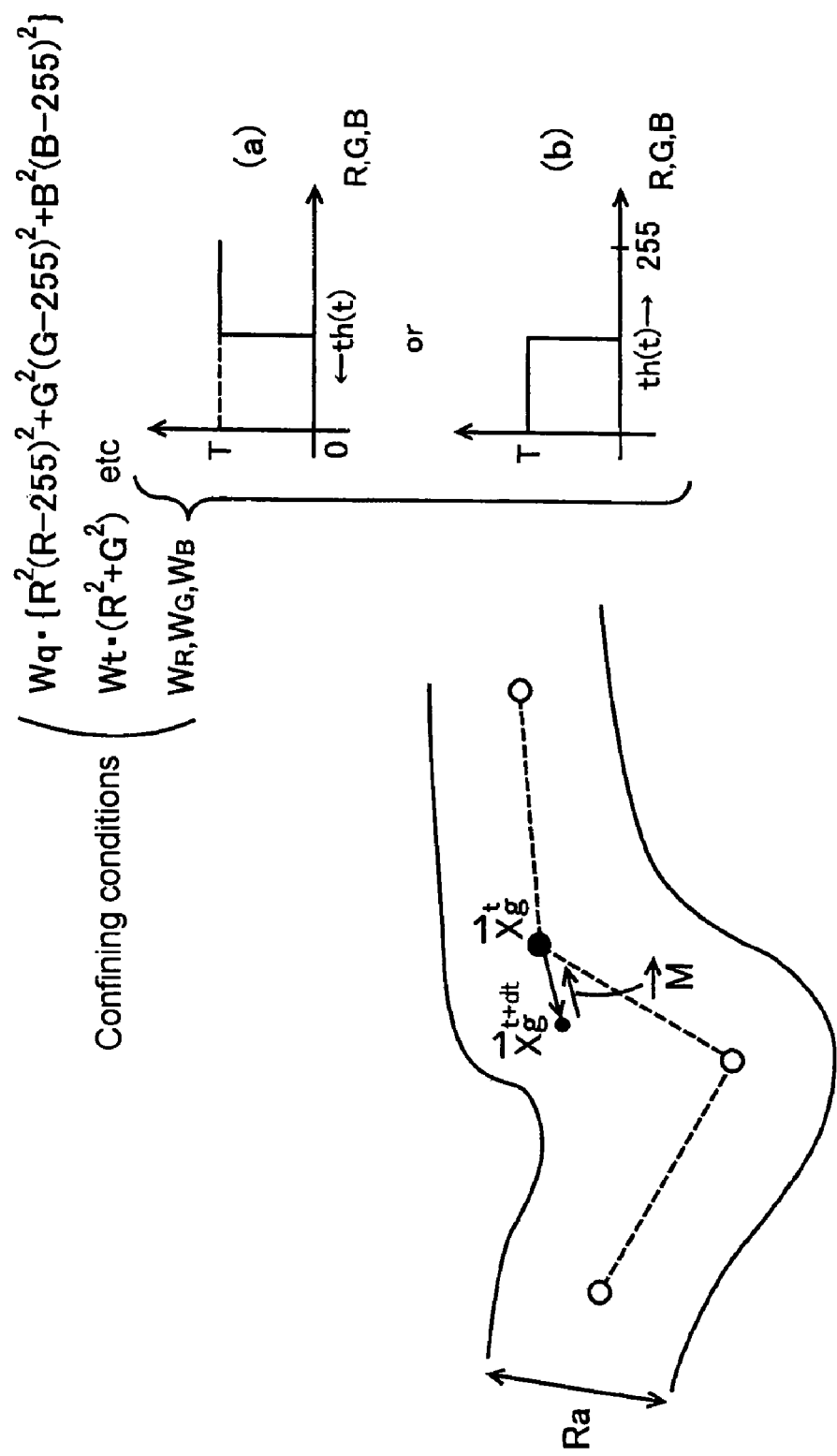
FIG. 6 is an explanatory diagram concerning confining conditions dependent on time.

FIG. 6 is an explanatory diagram concerning an effect provided by imposing time-dependent confining conditions. The confining conditions expressed by the formula (8) or (9) are intended to correct the position of a focused lattice point so that the focused lattice point will be confined to a certain position in a Lab space. For example, FIG. 6 shows a focused lattice point with a black circle and other lattice points with open circles. In FIG. 6, simulation is performed according to the formulae (4) to (6) so that a focused lattice point g will be moved from a position indicated by a vector $X^t_g$ at a time instant t to a position indicated by a vector $X^{t+dt}_g$ with the elapse of a microscopic time $d_t$.

When the confining conditions expressed by the formula (8) or (9) are imposed, it is intended to correct the position of the focused lattice point g indicated with the vector $X^{t+dt}_g$. If the correction is indicated by a vector M, the lattice point g is hardly moved with the elapse of the microscopic time. In other words, the excessively strict confining conditions cause the focused lattice point g to be immobile. Even when the position of a lattice point is not fixed, if excessive confining conditions are imposed, the lattice point is hardly moved. Consequently, the focused lattice point g may not be moved to be steady-state along with the passage of time.

The values R, G, and B to be assigned to the function $f(R,G,B)$ in the formula (7) are made variable, and time-dependent confining conditions are added. Consequently, in an early stage of simulation, the position of a lattice point can be freely changed within a permissible range Ra. In a final stage of simulation, the position of the lattice point can be controlled so that the lattice point will be confined to a desired position. As the confining conditions, various conditions can be adopted. For example, conditions expressed by the formula (10) or (11) presented below will do.

[Formula 10]

$$E=|f(R,G,B)-L_t^*|^2+w_R+w_G \quad (10)$$

[Formula 11]

$$E=|f(R,G,B)-L_t^*|^2+w_R \quad (11)$$

In both the formulae (10) and (11), the first term is identical to that of the formula (7), and the second and successive terms express time-dependent confining conditions. A condition $W_R$ is expressed by a step function dependent on a gray level R. Two conditions are imposed depending on a gray level finally represented by a confined lattice point. Specifically, as shown in FIG. 6(a), when the gray level R finally represented by the confined lattice point is 0, if the gray level R is equal to or larger than a threshold th, a predetermined constant T is adopted. If the gray level R is smaller than the threshold th, 0 is adopted. In this example, the threshold th depends on a time and gets smaller with the passage of time. Moreover, as shown in FIG. 6(b), when the gray level R finally represented by the confined lattice point is the maximum value (for example, 255), if the gray level R is equal to or larger than the threshold th, 0 is adopted. If the gray level R is smaller than the threshold th, the predetermined constant T is adopted. In this example, the threshold th gets larger with the passage of time (maximum value is 255).

A condition $W_G$ may be expressed by a function allowing the condition $W_G$ to behave similarly to the condition $W_R$ according to a gray level G. Furthermore, for a gray level B, a function $W_B$ that behaves similarly according to a gray level B may be adopted, though it is not included in the formulae (10) and (11). In order to finally confine a focused lattice point g to any position on the boundary line of a color gamut, two of the conditions $W_R$, $W_G$, and $W_B$ are added as confining conditions to the formula (7). In order to finally confine the focused lattice point g to any position on the boundary surface of the color gamut, one of the conditions $W_R$, $W_G$, and $W_B$ is added as a confining condition to the formula (7).

Specifically, in order to finally confine a focused lattice point g to any position on the boundary line of a color gamut, two of variables R, G, and B must be fixed to the maximum or minimum value. When the two variables are fixed to the minimum value, two functions shown in FIG. 6(a) are added to the formula (7) in order to impose conditions. When the two variables are fixed to the maximum value, two functions shown in FIG. 6(b) are added to the formula (7) in order to impose conditions. Moreover, in order to finally confine the focused lattice point g to any position on the boundary surface of the color gamut, one of the variables R, G, and B must be fixed to the minimum or maximum value. When the variable is fixed to the minimum value, the functions shown in FIG. 6(a) are added to the formula (7) in order to impose conditions. When the variable is fixed to the maximum value, the functions shown in FIG. 6(b) are added to the formula (7) in order to impose conditions.

In any case, according to the formulae (10) and (11), when a gray level relevant to any of the conditions $W_R$, $W_G$, and $W_B$ is equal to or larger than the threshold th, an objective function abruptly increases (FIG. 6(a)). When the gray level is smaller than the threshold th (FIG. 6(b)), the objective function abruptly increases. Consequently, a permissible range Ra is designated so that the gray level relevant to any of the conditions $W_R$, $W_G$, and $W_B$ will not be equal to or larger than the threshold th or smaller than the threshold th. Thus, in the early stage of simulation, the position of a lattice point can be freely changed within the permissible range Ra. In the final stage of simulation, the position of the lattice point is controlled so that the lattice point will be confined to a desired position.

As conditions including a condition for preventing imposition of excessively strict confining conditions, various conditions may be adopted. For example, conditions expressed by the formulae (12) and (13) presented below may be adopted.

[Formula 12]

$$E=|f(R,G,B)-L_t^*|^2+w_{t'}(R^2+G^2) \quad (12)$$

[Formula 13]

$$E=|f(R,G,B)-L_t^*|^2+w_{t'}(R-255)^2 \quad (13)$$

Herein, a coefficient $w_t$ included in the second term of each of the above formulae is a value getting larger with the passage of time. Namely, in the second term of the formula (12), $R^2$ gets larger with an increase in the gray level of red, and $G^2$ gets larger with an increase in the gray level of green. As the gray level of red or green exceeds 0 and gets larger, the solution of the second term increases. Consequently, the second term minimizes the objective function E and imposes a condition that the gray levels of red and green get as small as possible for optimization. Moreover, the condition gets stricter towards the final stage of simulation because of the time-dependency of the coefficient $w_t$. As time passes, the gray levels of red and green approach 0.

In the second term of the formula (13), as the gray level of red gets smaller than the maximum value of 255, the solution of $(R-255)^2$ increases. Consequently, the second term minimizes the objective function E and imposes a condition that the gray level of red should approach 255 for optimization. Furthermore, the condition gets stricter towards the final stage of simulation. In the formula (12), the gray levels of red and green is converged to the minimum value. In the formula (13), the gray level of red is converged to the maximum value. A formula may be defined for converging one or two of gray levels of red, green, and blue to the minimum or maximum value. In other words, a formula may be defined for multiplying one or two of linear combinations of $R^2$, $G^2$, $B^2$, $(R-255)^2$, $(G-255)^2$, and $(B-255)^2$ by the coefficient $w_t$.

In the above formulae (10) to (13), the second term is determined to depend on the gray level of any of red, green, and blue that is converged to the maximum or minimum value. The same number of different conditions as the number of boundary lines and boundary surfaces of a color gamut to which lattice points are confined are stipulated. Alternatively, a common formula may be used to stipulate a condition, which is equivalent to the one described by the second term, relative to all the boundary lines and boundary surfaces. For example, the formula (14) presented below may be adopted.

[Formula 14]

$$E=|f(R,G,B)-L_i|^2+w_q\cdot\{R^2(R-255)^2+G^2(G-255)^2+B^2(B-255)^2\} \quad (14)$$

Herein, a coefficient $w_q$ included in the second term gets larger along with the passage of time. In the second term of the formula (14), $R^2$, $G^2$, and $B^2$ help respective gray levels approach 0 as closely as possible. $(R-255)^2$, $(G-255)^2$, and $(B-255)^2$ help the gray levels approach 255 as closely as possible.

Consequently, the second term describes a condition for converging any of the gray levels of red, green, and blue or a set thereof to 0 or 255. Herein, the formula (14) is a conditional expression to be used in common irrespective of the initial position of a lattice point. Even when the formula (14) is used for optimization, a lattice point will not be confined to a position at which the lattice point represents 0s or 255s as all the gray levels of red, green, and blue, that is, to a vertex of a color gamut.

To be more specific, when the objective function E is minimized according to the formula (14), a set of gray level values of red, green, and blue which minimizes the result of summation between the first and second terms is selected. For optimization, generally, the independent variables (gray levels of red, green, and blue) are continuously changed in order to find the set of gray level values of red, green, and blue that minimizes the objective function E. When the gray levels of red, green, and blue are discretely changed, even if a set of gray level of red, green, and blue largely different from a current set of gray level values of red, green, and blue minimizes the objective function E, the set of gray levels of red, green, and blue cannot be directly (discretely) calculated.

Consequently, when the set of gray levels of red, green, and blue is continuously changed to reach a set of gray levels of red, green, and blue minimizing the objective function E, even if a set of gray levels of red, green, and blue largely different from the set of gray levels of red, green, and blue minimizes the objective function E, the set of gray levels of red, green, and blue cannot be calculated due to optimization. In other words, a set of gray levels of red, green, and blue that locally includes a minimal value is adopted as an optimal solution. When this property is inversely interpreted, the formula (14) permits free movement of a lattice point in the early stage of simulation and confines the lattice point to any position on the boundary of a color gamut in the final stage of simulation.

For example, a gray level of red that is represented by a lattice point and that is nearly 0 changes but is not converged to 0 in the early stage of simulation, and gray levels of green and blue changes accordingly. In this case, because the first term of the formula (14) gets smaller, the second term may diminish greatly. Owing to optimization, the position of the lattice point shifts but does not approach a position at which the lattice point represents 0 as a gray level of red. However, when the coefficient $w_q$ increases in the final stage of simulation, the lattice point reaches the position at which it represents, 0 as the gray level of red. Consequently, the solution of the formula (14) greatly decreases. While the gray levels of red, green, and blue are changed, the gray level of red is converged to 0.

On the other hand, the second term of the formula (14) provides a minimum value when the G and B values are 0s. When the R value is converged to 0, if the gray levels of green and blue must be varied, the solution of the first term must be varied. Consequently, the solution of the formula (14) gets larger. Therefore, in almost all cases, after the R value is converged to 0, the gray levels of green and blue are not largely changed. Namely, a lattice point stops at a certain position. In other words, when a lattice point locally represents a minimal value, the lattice point becomes steady-state.

As mentioned above, when the second term is added to the formula (7), a lattice point can be confined to any position on the boundary line or boundary surface of a color gamut. A specific region to which a lattice point is confined is not limited to the boundary line or boundary surface of the color gamut. For example, confining conditions may be stipulated so that a specific lattice point will signify an achromatic color. For this purpose, various formulae can be adopted. According to the formula (15) presented below, a lattice point can be confined so that the gray levels of red, green, and blue represented by the lattice point will be equal to one another (namely, the lattice point signifies an achromatic color).

[Formula 15]

$$E=|f(R,G,B)-L_i|^2+w_g\cdot\{(R-G)^2+(G-B)^2\} \quad (15)$$

A coefficient $w_g$ included in the second term of the formula (15) gets larger along with the passage of time. In other words, in the second term of the formula (15), when the gray levels of red and green are closer to each other, $(R-G)^2$ gets smaller. When the gray levels of green and blue are closer to each other, $(G-B)^2$ gets smaller. As the gray levels of red, green, and blue recede farther from an equal value, the solution of the second term gets larger. Consequently, the second term minimizes the objective function E, and imposes a condition that, for optimization, the gray levels of red and green should get as close as possible to each other and the gray levels of green and blue should get as close as possible to each other. Namely, the gray levels of red, green, and blue are made as close as possible to one another. Owing to the time-dependency of the coefficient $w_g$, the condition gets stricter towards the final stage of simulation. Consequently, the gray levels of red, green, and blue approach an equal value.

Furthermore, a lattice point can be confined to a predetermined position in a Lab space. For example, a position to which the lattice point is confined is defined with the formula (16) below.

Figure 7:
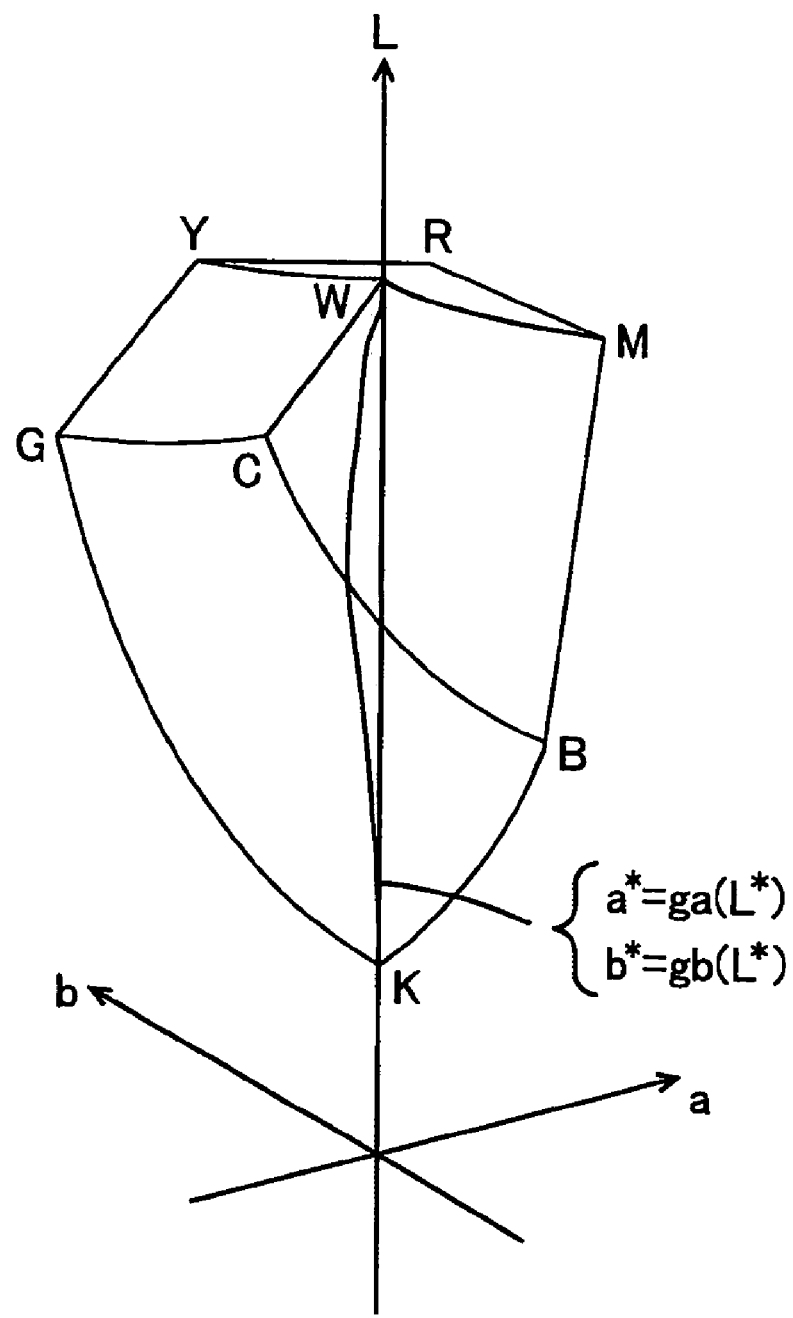
FIG. 7 is an explanatory diagram concerning constraints imposed on a curve in a Lab space.

[Formula 16]

$$\begin{cases} a^* = g_a(L^*) \\ b^* = g_b(L^*) \end{cases} \quad (16)$$

where functions $g_a$ and $g_b$ provide a* and b* values in the Lab space relevant to a lightness value L* therein. As shown in FIG. 7, the functions are plotted as a curve in the Lab space.

Moreover, the objective function is expressed by the formula (17) presented below.

[Formula 17]

$$E = |f(R,G,B) - L_t|^2 + w_c \cdot \{(a^*_f - g_a(L^*_f))^2 + (b^*_f - g_b(L^*_f))^2\} \quad (17)$$

Herein, a coefficient $w_c$ included in the second term of the formula (17) increases along with the passage of time. Moreover, $L^*_f$, $a^*_f$, and $b^*_f$ values are Lab values provided as functions of RGB values according to $f(R,G,B)$.

Lab values provided as the functions included in the second term of the formula (17) recede farther from the curve shown in FIG. 7, the solution of the second term gets larger. Consequently, the second term minimizes the objective function E, and imposes a condition that, for optimization, the Lab values associated with the gray levels of red, green, and blue should be fitted as close as possible to the curve shown in FIG. 7. Moreover, owing to the time-dependency of the coefficient $w_c$, the condition gets stricter towards the final stage of simulation. The Lab values associated with the gray levels of red, green, and blue can be fitted closer to the curve.

As mentioned above, when a lattice point is confined to any position on an arbitrary curve, compared with a condition that a lattice point is confined to a position at which the lattice point signifies an achromatic color (a position on an L axis), the position of the lattice point can be flexibly controlled. Specifically, depending on a medium thought to be used to create the color correction LUT 41, a predetermined saturation value may have to be appended to an output color that is the achromatic color. Once the curve is defined, a lattice point can be confined to any position in various conceivable cases. Furthermore, the formulae (15) and (17) are mere examples. Moreover, a color signified at a position to which a lattice point is confined is not limited to gray, but conditions for confining a lattice point to a position at which the lattice point signifies an arbitrary color can be imposed. For example, confining conditions may be imposed so that a lattice point signifying a flesh color will be confined to a specific position. Various confining conditions can be imposed.

(3-3) Smoothing Procedure

Figure 8:
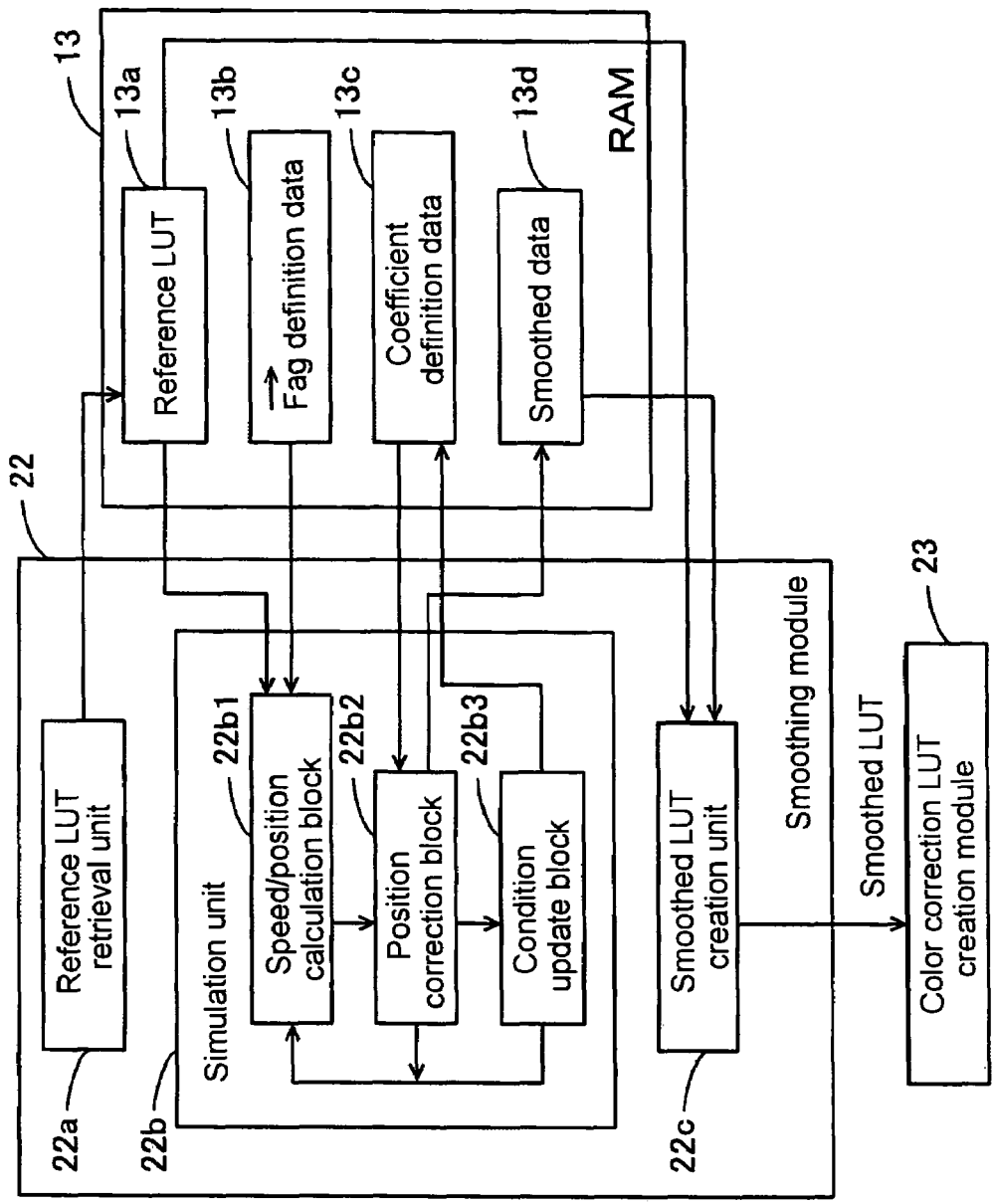
FIG. 8 is a block diagram showing the detailed configuration of a smoothing module.
Figure 9:
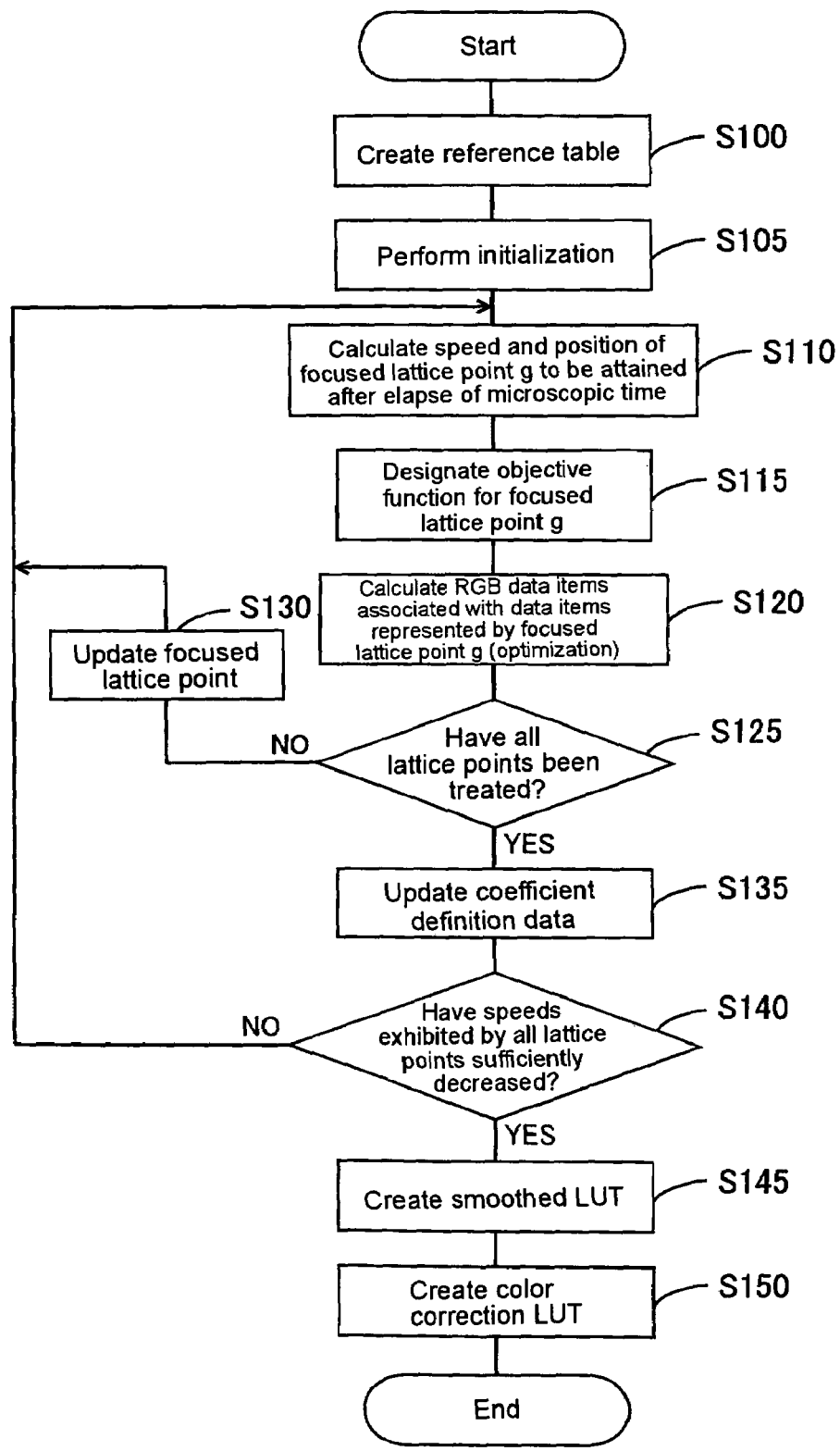
FIG. 9 is a flowchart describing an example of processing to be performed by a lookup table creation system.

In the present embodiment, as mentioned above, the formulae (4) to (6) are used to describe the motion of a lattice point, and the formulae (7) to (17) are used to impose confining conditions if necessary so as to correct Lab values. Moreover, the reference LUT 43 is referenced in order to retrieve a set of RGB data items associated with the set of Lab values. FIG. 8 is a block diagram showing a smoothing module 22 that executes the processing. FIG. 9 is a flowchart describing an example of processing to be performed by a LUT creation unit 20. The smoothing module 22 includes a reference LUT retrieval unit 22a, a simulation unit 22b, and a smoothed LUT creation unit 22c.

The reference LUT retrieval unit 22a is a module for retrieving the reference LUT 43 and storing it in the RAM 13. At step S100 described in FIG. 9, the reference LUT 43 created by the reference LUT creation module 21 is retrieved from the hard disk 14 and stored it in the RAM 13 (reference LUT 13a). Consequently, the processing performed by the reference LUT retrieval unit 22a corresponds to processing performed by a reference profile retrieval unit.

The simulation unit 22b uses RGB data items and Lab data items, which are specified in the reference LUT 13a, to simulate the motion of a lattice point. The simulation unit 22b includes a speed/position calculation block 22b1, a position correction block 22b2, and a condition update block 22b3. The speed/position calculation block 22b1 and position correction block 22b2 first initialize information required for processing (step S105). Specifically, the speed/position calculation block 22b1 assigns symbols to the respective sets of Lab data items specified in the reference LUT 13a so that the sets of Lab data items can be uniquely discriminated from one another, and calculates the initial speed of a motion made by each lattice point. Moreover, the position correction block 22b2 references coefficient definition data 13c to determine confining conditions required for each lattice point.

The coefficient definition data 13c stipulates a coefficient and a confining condition formula which should be used for each lattice point, and is defined in advance. For example, when the formula (12) or (13) is used to confine a lattice point to any position on the boundary line or boundary surface of a color gamut, a coefficient $w_t$ and a confining formula by which the coefficient $w_t$ is multiplied are determined. These pieces of information are associated with a symbol with which the lattice point is identified. Moreover, when the formula (14) is used to confine a lattice point to any position on the boundary line or boundary surface of the color gamut, a coefficient $w_q$ and a confining formula by which the coefficient $w_q$ is multiplied are determined. These pieces of information are then associated with a symbol with which the lattice point is identified.

Furthermore, when the formula (15) is used to confine a lattice point to a position at which the lattice point signifies an achromatic color, a coefficient $w_g$ and a confining formula by which the coefficient $w_g$ is multiplied are determined. These pieces of information are then associated with a symbol with which the lattice point is identified. When a lattice point signifying an achromatic color is confined to a position expressed by the formula (16), a coefficient $w_c$ and a confining formula by which the coefficient $w_c$ is multiplied are determined and assigned to the formula (17). These pieces of information are then associated with a symbol with which the lattice point is identified.

As mentioned above, any of the formulae (12) to (17) may be used to confine each lattice point. Confining conditions may be determined based on a predetermined rule or preferable confining conditions may be determined through trial and error. The confining conditions can be determined according various methods. The formula (10) or (11) may be used to confine each lattice point. In this case, the conditions $W_R$, $W_G$, and $W_B$ are defined and which of the conditions should be added is also determined. These pieces of information are associated with a symbol with which each lattice point is identified. Moreover, if a lattice point is not confined to any predetermined position, the formula (7) is designated.

The coefficient definition data 13c is data concerning a confining formula determined as mentioned above. At step 105, a confining condition formula is determined based on the definition data with an elapsed time set to 0. After initialization is performed as mentioned above, the speed/position calculation block 22b1 designates a lattice point, which is not an object of processing, as a focused lattice point, and calculates the speed of a motion made by the focused lattice point and the position of the focused lattice point. In the present embodiment, the data 13b representing the definition of a vector $Fa_g$ provided as the formula (3) is produced in advance, and stored in the RAM 13 at the time of invoking the LUT creation unit 20.

The speed/position calculation block 22b1 retrieves the definition data 13b, and calculates the speed and position of the focused lattice point g to be attained after the elapse of a microscopic time (step S110). When the speed and position to be attained after the elapse of the microscopic time are calculated, the position correction block 22b2 retrieves a confining condition formula determined for the focused lattice point g at step S105, and designates the objective function E for the focused lattice point g (step S115). The objective function E is used to achieve optimization (step S120). Consequently, the position of the focused lattice point g is corrected based on confining conditions, and RGB data items associated with corrected Lab data items are worked out. The results are stored as smoothed data 13d in the RAM 13. If data is already stored in relation to the same focused lattice point, the smoothed data 13d is updated with the optimized data.

Owing to the foregoing processing, the state of the focused lattice point g to be attained after the elapse of a microscopic time has been simulated. The speed/position calculation block 22b1 determines whether calculation of a speed and a position to be attained after the elapse of the microscopic time has been performed on all lattice points (step S125). If the calculation of a speed and a position to be attained after the elapse of the microscopic time is not recognized to have been performed at step S125, an untreated lattice point is designated as a new focused lattice point (step S130). The processing succeeding step S110 is repeated.

If the calculation of a speed and a position to be attained after the elapse of the microscopic time is recognized to have been performed at step S125, it means that the speed and position to be attained after the elapse of the microscopic time have been determined on all lattice points. The condition update block 22b3 updates the confining conditions that should be varied along with the passage of time (step S135). Specifically, since the coefficients $w_t$, $w_q$, $w_g$, and $w_c$ and the conditions $w_R$, $w_G$, and $w_B$ are varied along with the passage of time, the coefficients and conditions are varied by predetermined values in order to update the coefficient definition data 13c.

For example, the coefficients $w_t$, $w_q$, $w_g$, and $w_c$ are increased by predetermined values, and the threshold th relevant to the conditions $w_R$, $w_G$, and $w_B$ is varied by a predetermined value. After this processing is completed, the speed/position calculation block 22b1 determines whether the speeds of motions made by all lattice points have decreased sufficiently (step S140). The processing succeeding step S110 is repeated until the speeds exhibited by all lattice points are recognized to have decreased sufficiently.

If the speeds exhibited by all lattice points are recognized to have decreased sufficiently at step S140, all the lattice points are recognized to have become steady-state. The smoothed LUT creation unit 22c stores the relationships of correspondences between sets of RGB data items and sets of Lab data items, which are represented by the smoothed data 13d, as the smoothed LUT 42 in the hard disk 14 (step S145). After the smoothed LUT 42 is created, the color correction LUT creation module 23 references the smoothed LUT 42 to create the color correction LUT 41, and stores the color correction LUT 41 in the hard disk 14 (step S150). As mentioned above, in the present embodiment, the processing performed by the simulation unit 22b corresponds to processing performed by a smoothed position retrieval unit, and the processing performed by the smoothed LUT creation unit 22c corresponds to processing performed by a profile creation unit.

In the foregoing smoothing, part of a virtual force that acts on an adjoining lattice point is, as expressed by the formula (3), added to a virtual force acting on a focused lattice point. Even when a fixed lattice point is present, the disposition of the focused lattice point can be smoothed. Moreover, various confining conditions expressed by the formulae (7) to (17) can be imposed, and the disposition of a lattice point can be smoothed under the various conditions. Furthermore, when the speeds and positions of all lattice points to be attained after the elapse of a microscopic time are taken into consideration, the simultaneous movements of all the lattice points can be simulated. Compared with when lattice points are optimized one by one, the lattice points can be smoothed without accumulation of an error.

(4) Other Embodiments

The aforesaid embodiment is a mere example. As long as the disposition of a lattice point can be smoothed by performing simulation using a virtual force, other various forms can be adopted. For example, the invention may be adapted to a system that performs printing using a profile recommended by the International Color Consortium (ICC). The ICC profile includes a source profile that helps convert color component values, which are employed in image input equipment such as a display, into coordinates (Lab values) in an equipment-independent color space, and a medium profile that helps convert the coordinates in the equipment-independent color space into color component values employed in image output equipment such as a printer.

The relationships of correspondences between sets of target sRGB data items and sets of target Lab data items which are shown in FIG. 1 may be regarded as the source profile, and the relationships of correspondences between the sets of Lab data items and sets of printer RGB data items may be regarded as the medium profile. In this case, the RGB data items retrieved from the medium profile can be converted into DMYKlclm data items by referencing the smoothed LUT 42 created in the invention.

The printer 15 can accommodate six color inks of cyan, magenta, yellow, black, light cyan, and light magenta. The number of colors may be increased by adding dark yellow (DY), or may be decreased by excluding light cyan and light magenta. Furthermore, other colors, for example, red and violet may be used to install six color inks of cyan, magenta, yellow, black, red, and violet.

Furthermore, as the virtual force, a force proportional to a distance between adjoining lattice points is adopted. The magnitude of a force to be applied to each lattice point is not limited to the one proportional to the distance but may simply increase along with an increase in the distance. A resistance acting on a lattice point is not limited to a force that is proportional to a speed and that is opposite to the speed. The resistance may be a force resistive to a motion caused by a virtual force acting on each lattice point. Various forces are adoptable as the resistance.

The definition of adjoining lattice points of a focused lattice point is not limited to the aforesaid one. For example, in addition to lattice points adjoining the focused lattice point in the directions of R, G, and B axes in an RGB space, lattice points adjoining the focused lattice point in directions oblique to the axes in the RGB space may be included in the adjoining lattice points. Furthermore, a color space in which the dispositions of lattice points are smoothed should merely be independent of equipment and may be not only the aforesaid L*a*b* space but also an L*u*v* space or an XYZ space.

The foregoing invention has been described in terms of preferred embodiments. However, those skilled in the art will recognize that many variations of such embodiments exist. Such variations are intended to be within the scope of the present invention and the appended claims.

What is claimed is:

1. A profile creation method for creating a profile that associates lattice points defined in an equipment-dependent color space with lattice points defined in an equipment-independent color space, comprising:

retrieving, from a memory, a reference profile that associates a plurality of lattice points in the equipment-dependent color space with lattice points in the equipment-independent color space;

defining a virtual force that acts on a focused lattice point in the equipment-independent color space, and calculating a position at which the focused lattice point is located in a steady-state in which the virtual force acts on the focused lattice point;

retrieving a lattice point in the equipment-dependent color space associated with the position, at which the steady-state focused lattice point is located, from the reference profile, and creating a profile by associating the position of each steady-state focused lattice point with a lattice point in the equipment-dependent color space; and outputting the created profile for use in color conversion of image data, wherein the virtual force includes a resistance whose magnitude is proportional to a speed at which the focused lattice point moves.

2. The profile creation method according to claim 1, wherein the virtual force includes a force opposite to the virtual force acting on a lattice point adjoining the focused lattice point.

3. The profile creation method according to claim 1, wherein the position at which the steady-state focused lattice point is located is determined by repeating the processing of defining the virtual force according to the position of the focused lattice point and then calculating the speed of a motion made by the focused lattice point and the position of the focused lattice point, which will be attained after the elapse of a microscopic time, until the speed meets a predetermined condition.

4. The profile creation method according to claim 3, wherein the position at which the focused lattice point will be located after the elapse of a microscopic time is corrected so that a lattice point into which an arbitrary lattice point in the equipment-dependent color space is converted by referencing the reference profile will fall within a color gamut defined in the equipment-independent color space.

5. The profile creation method according to claim 3, wherein the position of a focused lattice point in a specific region of a color gamut is corrected to approach a lattice point in the equipment-independent color space into which a lattice point located in the specific region of the color space defined in the equipment-dependent color space is converted by referencing the reference profile.

6. The profile creation method according to claim 4, wherein the position of a predetermined focused lattice point is corrected by imposing confining conditions so that the focused lattice point will hardly recede from a specific position in the equipment-independent color space.

7. The profile creation method according to claim 4, wherein as long as the magnitude of correction falls within a predetermined permissible range, the correction in an arbitrary direction is permitted.

8. The profile creation method according to claim 7, wherein the permissible range is narrowed along with the passage of time.

9. The profile creation method according to claim 1, wherein: the equipment-dependent color space is a color space in which image data supported by first image equipment is defined; and the created profile is referenced in order to specify the relationships of correspondences between the lattice points in the equipment-dependent color space and the lattice points in the equipment-dependent color space, in which image data supported by second image equipment is described, for the purpose of creation of a color correction profile.

10. A printer, comprising:

a converting unit that converts image data by referencing a created profile created by the profile creation method according to claim 1; and a printing unit that performs to print the image data.

11. A profile creation system for creating a profile that associates lattice points defined in an equipment-dependent color space with lattice points defined in an equipment-independent color space, comprising:

a reference profile retrieval unit that retrieves a reference profile that associates a plurality of lattice points in the equipment-dependent color space with lattice points in the equipment-independent color space;

a smoothed position calculation unit that defines a virtual force which acts on a focused lattice point in the equipment-independent color space, and calculates a position at which the focused lattice point is located in a steady-state in which the virtual force acts on the focused lattice point;

a profile creation unit that retrieves a lattice point in the equipment-dependent color space, which is associated with the position of the steady-state focused lattice point, from the reference profile, and creates a profile by associating the position of each steady-state focused lattice point with a lattice point in the equipment-dependent color space; and an output unit that outputs the created profile for use in color conversion of image data, wherein the virtual force includes a resistance whose magnitude is proportional to a speed at which the focused lattice point moves.

12. A profile creation program product that includes a program that creates a profile which associates lattice points defined in an equipment-dependent color space with lattice points defined in an equipment-independent color space, the program being stored on a computer-readable medium and implementing in a computer:

a reference profile retrieval program code that retrieves a reference profile which associates a plurality of lattice points in the equipment-dependent color space with lattice points in the equipment-independent color space;

a smoothed position calculation program code that defines a virtual force which acts on a focused lattice point in the equipment-independent color space, and calculates a position at which the focused lattice point is located in a steady-state in which the virtual force acts on the focused lattice point;

a profile creation program code that retrieves a lattice point in the equipment-dependent color space, which is associated with the position of the steady-state focused lattice point, from the reference profile, and creates a profile by associating the position of each steady-state focused lattice point with a lattice point in the equipment-dependent color space; and an output program code that outputs the created profile for use in color conversion of image data, wherein the virtual force includes a resistance whose magnitude is proportional to a speed at which the focused lattice point moves.

13. A printer that uses a profile that associates lattice points defined in an equipment-dependent color space with lattice points defined in an equipment-independent color space to perform color conversion on image data, and performs printing based on the image data that has been subjected to the color conversion, wherein the profile is created by:

retrieving a reference profile that associates a plurality of lattice points in the equipment-dependent color space with lattice points in the equipment-independent color space;

defining a virtual force that acts on a focused lattice point in the equipment-independent color space, and calculating a position at which the focused lattice point is located in a steady-state in which the virtual force acts on the focused lattice point; and retrieving a lattice point in the equipment-dependent color space associated with the position, at which the steady-state focused lattice point is located, from the reference profile, and creating a profile by associating the position of each steady-state focused lattice point with a lattice point in the equipment-dependent color space, and wherein the virtual force includes a resistance whose magnitude is proportional to a speed at which the focused lattice point moves.

* * * * *